US005198840A

United States Patent [19]

Ochiai et al.

[11] Patent Number: 5,198,840

[45] Date of Patent: Mar. 30, 1993

[54] IMAGE FORMING APPARATUS WITH TONER ACCUMULATING PORTION AT RECORDING ELECTRODE PORTION

[75] Inventors: Toshihiko Ochiai, Tokyo; Takeshi Matoba, Yokohama, both of Japan

[73] Assignee: Canon Kabushiki Kaisha, Tokyo, Japan

[21] Appl. No.: 720,192

[22] Filed: Jun. 24, 1991

[30] Foreign Application Priority Data

Jun. 25, 1990 [JP] Japan ........ 2-164042

May 31, 1991 [JP] Japan ........ 3-156119

[51] Int. Cl.[5] ........ G01D 15/06

[52] U.S. Cl. ........ 346/155; 346/153.1; 346/160.1; 346/159

[58] Field of Search ........ 346/153.1, 155, 160.1, 346/159

[56] References Cited

U.S. PATENT DOCUMENTS 3,914,771 10/1975 Lunde et al. ........ 346/74
4,101,909 7/1978 Solmon et al. ........ 346/153.1
4,103,306 7/1978 Clapp ........ 346/153.1
4,175,265 11/1979 Nelson et al. ........ 346/153.1
4,316,198 2/1982 Erickson ........ 346/150
4,364,071 12/1982 Shafer ........ 346/153.1
4,394,671 7/1983 Erickson ........ 346/155
4,502,061 2/1985 Ando et al. ........ 346/153.1
4,739,348 4/1988 Ando et al. ........ 346/155
4,788,564 11/1988 Ochiai ........ 346/153.1
4,797,695 1/1989 Konno et al. ........ 346/160.1 X
4,831,394 5/1989 Ochiai et al. ........ 346/160.1
4,884,188 11/1989 Berkhout et al. ........ 346/160.1

FOREIGN PATENT DOCUMENTS 0342798 11/1989 European Pat. Off. .
51-46707 4/1976 Japan .

*Primary Examiner*—Benjamin R. Fuller
*Assistant Examiner*—Randy W. Gibson
*Attorney, Agent, or Firm*—Fitzpatrick, Cella, Harper & Scinto

[57] ABSTRACT

An image forming apparatus forms a record image with developer on a recording medium by supplying the developer between a plurality of recording electrodes and the recording medium disposed in confronting relation to the recording electrodes and by applying a signal voltage to the recording electrodes in response to image information. The image forming apparatus improves the image quality and simplifies the apparatus by providing a prevention means disposed proximate the recording electrodes and downstream thereof in a developer moving direction, for preventing the developer from shifting.

25 Claims, 14 Drawing Sheets

IMAGE FORMING APPARATUS WITH TONER ACCUMULATING PORTION AT RECORDING ELECTRODE PORTION

BACKGROUND OF THE INVENTION

1. Field of the Invention

The present invention relates to an image forming apparatus, and more particularly it relates to an image forming apparatus wherein a prevention means for preventing developer from shifting toward a recording medium is arranged in the proximity of recording electrodes.

2. Related Background Art

In the past, various image forming apparatuses capable of forming an image in response to image information have been proposed. Among them, there is an apparatus wherein an image is formed on a recording medium by electrostatically adhering conductive magnetic toner (fine powder developer) to the recording medium.

For example, Japanese Patent Laid-Open No. 51-46707 (corresponding to U.S. Pat. No. 3,914,771) discloses such technique. As shown in FIG. 10, conductive magnetic toner 51 disposed around a non-magnetic cylinder 50 is attracted onto an outer surface of the non-magnetic cylinder 50 by alternate magnetic field generated by a rotary magnet 52 arranged in a coaxial relation to the non-magnetic cylinder 50 and is conveyed along the outer surface of the non-magnetic cylinder. The toner 51 is conveyed to pass over recording electrodes 53 closedly spaced apart from each other and arranged on the outer surface of the non-magnetic cylinder along a longitudinal axis thereof. When the toner is contacted by a sheet-shaped recording medium 54 disposed in the vicinity of the non-magnetic cylinder 50 and comprising an inner conductive layer 54*b* and an outer insulation layer (or dielectric layer) 54*a*, a voltage is applied by an electric power source 55. By applying the voltage between the recording electrodes 53 and the conductive layer 54*b* of the recording medium 54 in response to image information, an image is formed on the recording medium by adhering the toner 51 to the insulation layer 54*a* of the recording medium 54.

In an image forming apparatus using the above-mentioned principle, as shown in FIG. 11, with respect to a recording medium 54 shifted by a drive feed roller 56*a* and a driven feed roller 56*b*, toner 51 is conveyed onto recording electrodes 53 by rotating a rotary magnet 52 disposed in a coaxial relation to a non-magnetic cylinder 50 arranged in a developing device 57. And, by selectively adhering and non-adhering the toner to the recording medium by selectively applying the voltage from a record controlling portion 58 to the recording electrodes, an image is formed on the recording medium.

For example, when the voltage of 40 V from the record controlling portion 58 is applied to the recording electrodes, the toner 51 is adhered to the recording medium 54; whereas, when the voltage is 0 V, the toner is not adhered to the recording medium. By alternating such operations, the image can be formed.

The toner 51 adhered to the recording medium 54 is displayed at an image display area 59 as a toner image. Then, the charges on the toner image are removed in an earthing direction by frictionally sweeping a surface of the recording medium by means of a cleaning member 60 comprising conductive carbon fibers, conductive resin, conductive rubber or similar material, with the result that the toner is dropped from the surface of the recording medium onto the non-magnetic cylinder 50 to be re-used. Incidentally, the residual charges remaining on the recording medium 54 are removed in an earthing direction by means of a charge removing brush 61.

With the above-mentioned arrangement, since the developer is the conductive magnetic toner, a toner brush (toner chains) is formed between the recording electrodes 53 and the recording medium 54 along the lines of magnetic force. Since the toner chain has low electric resistance, when the electric charges are applied from the recording electrodes 53 to the toner chains, the latter can contribute to the recording operation.

However, with the above-mentioned arrangement, since the length of the toner chain and the binding force between the toner particles (the stronger such binding force the smaller the electric resistance to facilitate the recording) depend upon the magnetic force of the rotary magnet 52, the following problems arise. That is to say, if the magnetic force of the rotary magnet 52 is weaker, the toner chain becomes shorter, with the result that, since it is difficult to obtain contact between the toner chains and the recording medium, it is feared that the recording is imperfect. On the other hand, if the magnetic force becomes stronger, the productivity of the rotary magnet 52 is decreased, thus making the apparatus expensive. Further, when the magnet is made of resin or rubber, the maximum magnetic flux density immediately above the surface of the magnet becomes 1000~1200 Gauss. In this case, since the image can be formed on the recording medium by contacting the toner chains on the recording electrodes 53 with the recording medium 54 only when a distance between the recording electrodes 53 and the recording medium 54 is 400 μm at most, if the apparatus is large-sized, it is difficult to maintain the distance between the recording electrodes 53 and the recording medium 54 to 400 μm due to the discrepancy in the manufacturing accuracy of parts of the apparatus.

For example, due to the imperfect straightness of the cylinder 50 shown in FIG. 11, imperfect straightness of the recording electrodes 53, and the distortion of the drive and driven feed rollers 56*a*, 56*b*, it is feared that the recording electrodes 53 contact with the recording medium 54 to damage them.

SUMMARY OF THE INVENTION

An object of the present invention is to eliminate the above-mentioned conventional drawbacks.

Another object of the present invention is to eliminate the above-mentioned conventional drawbacks and at the same time to simplify the construction of an image forming apparatus.

Another object of the present invention is to provide an image forming apparatus which can eliminate the above-mentioned conventional drawbacks.

In order to achieve the above objects, the present invention provides an image forming apparatus comprising a plurality of recording electrodes, a voltage applying means for applying a signal voltage to the recording electrodes in response to image information, a recording medium disposed in confronting relation to the recording electrodes, a drive means for shifting the recording electrodes and the recording medium relatively, a developer supplying means for supplying developer between the recording electrodes and the recording medium, and a prevention means disposed near and at a downstream side of the recording electrodes in a developer moving direction, for preventing movement of the developer.

DETAILED DESCRIPTION OF THE PREFERRED EMBODIMENTS

The present invention will now be explained in connection with embodiments thereof with reference to the accompanying drawings.

Figure 1:
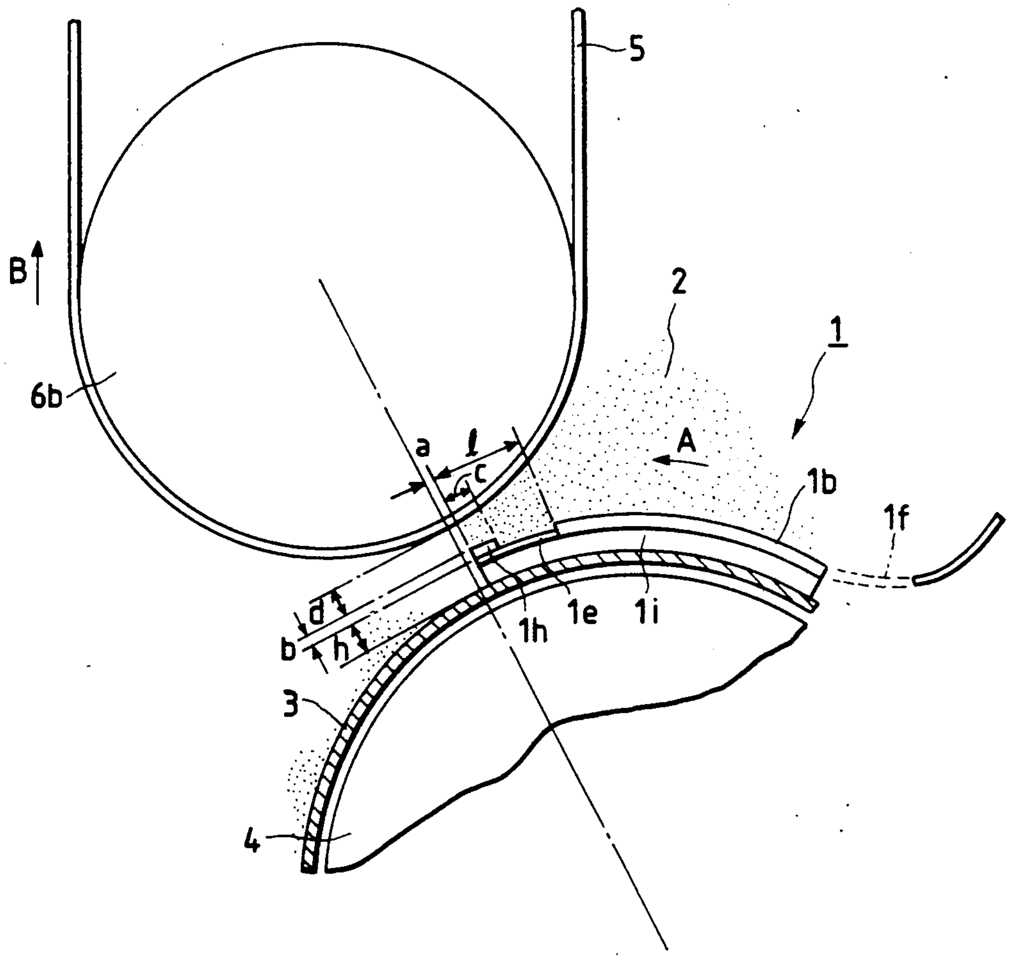
FIG. 1 is an enlarged elevational sectional view for explaining an image forming portion.
Figure 2:
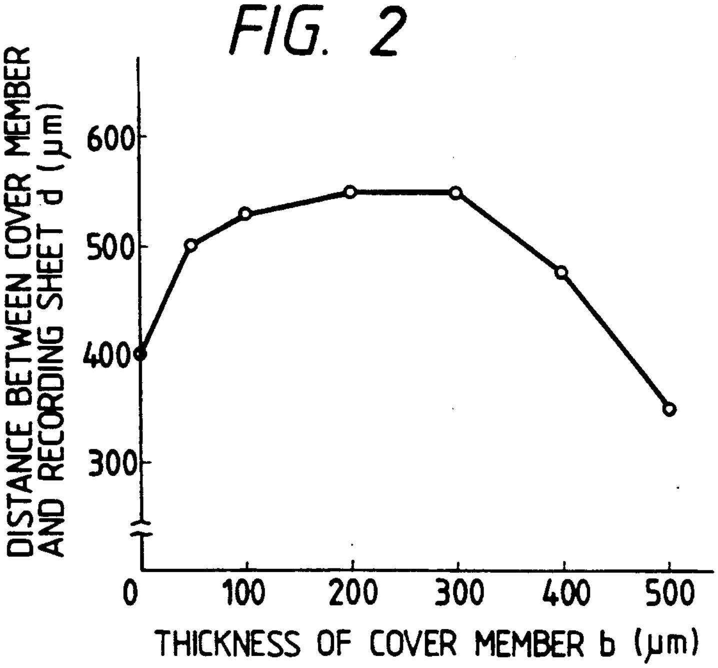
FIG. 2 is a graph showing a relation between a thickness of a coating member and a distance between the coating member and a recording medium.
Figure 5:
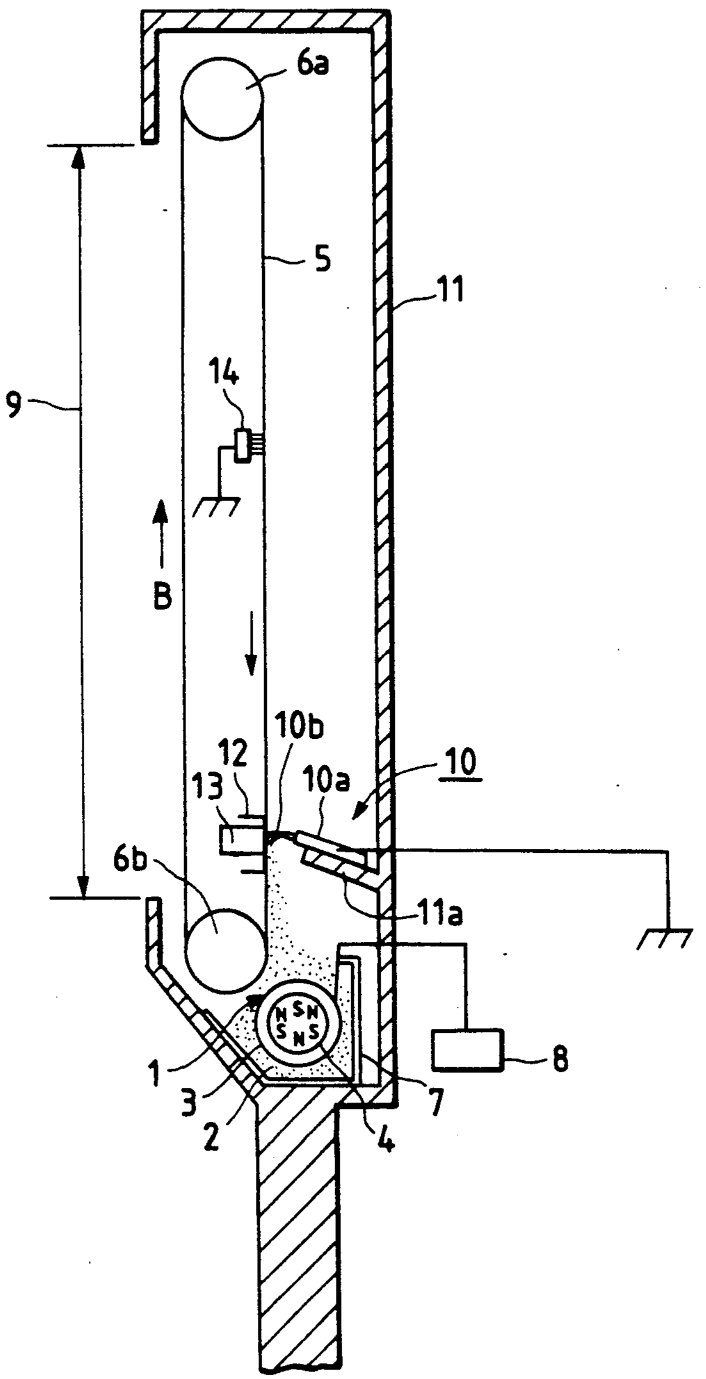
FIG. 5 is a schematic elevational sectional view of an image forming apparatus.
Figure 6:
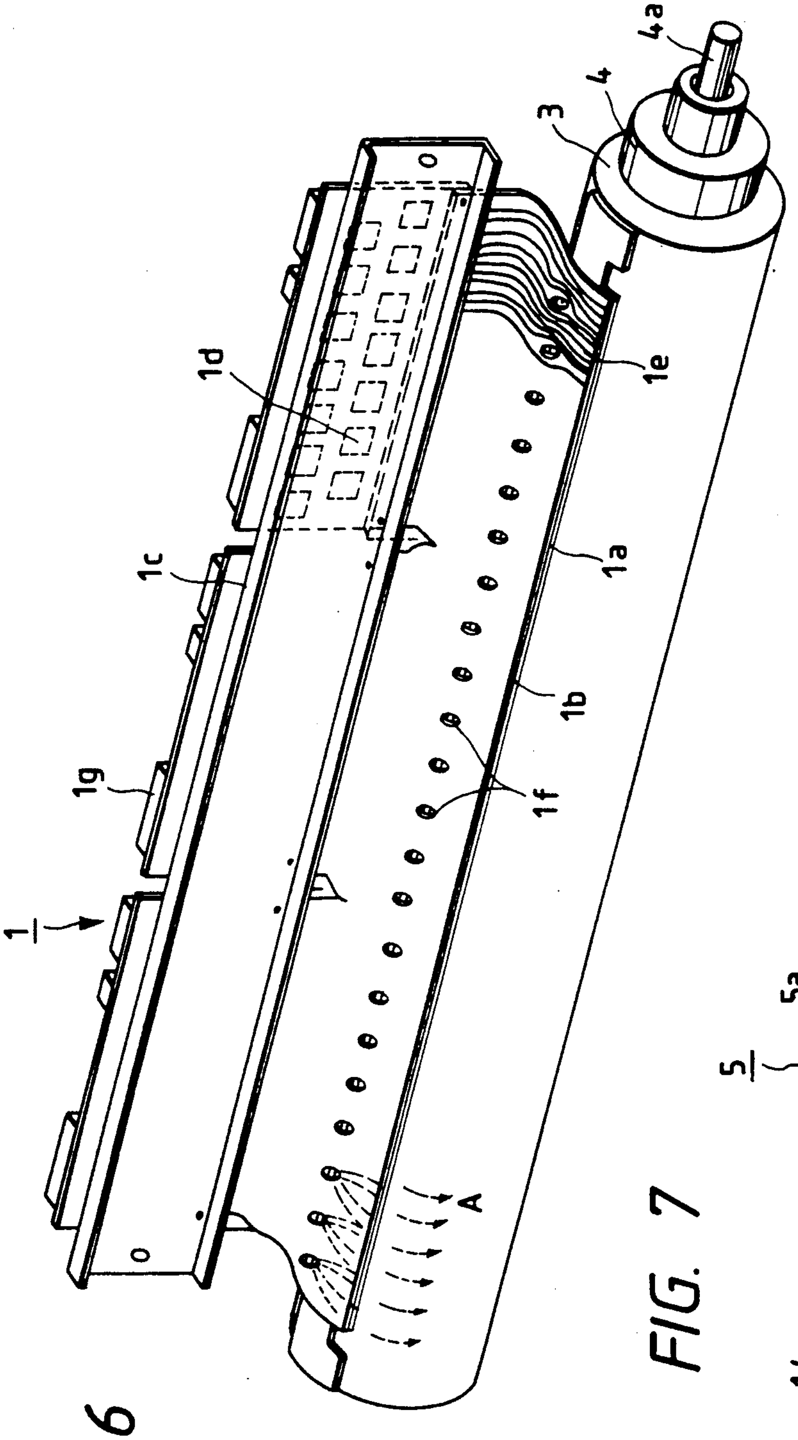
FIG. 6 is a perspective view of a recording electrode assembly.
Figure 7:
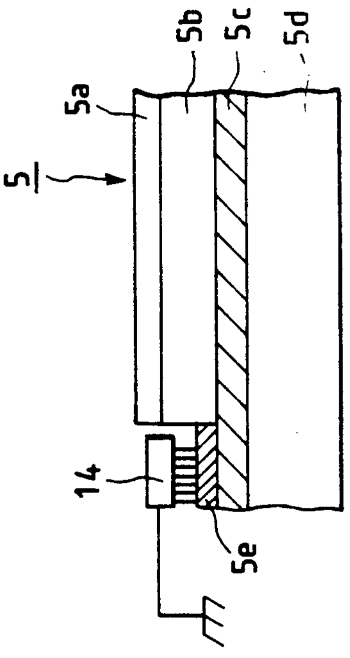
FIG. 7 is an enlarged sectional view of a portion of the recording medium.

FIG. 1 is an enlarged elevational sectional view for explaining an image forming portion; FIG. 2 is a graph showing a relation between a thickness of a coating member and a distance between the coating member and a recording medium; FIGS. 3A, 3B, 4A and 4B are explanatory views for explaining the principle of the image forming portion; FIG. 5 is a schematic elevational sectional view of an image forming apparatus; FIG. 6 is a perspective view of a recording electrode assembly; and FIG. 7 is an enlarged sectional view of a portion of the recording medium.

First of all, a brief construction of an image forming apparatus will be explained with reference to FIGS. 5 and 6.

In FIG. 5, recording electrodes 1 for applying a voltage to conductive magnetic developer 2 (referred to as "toner" hereinafter) in response to image information are closely spaced apart from each other and are attached to a peripheral surface of a non-magnetic cylinder 3 (referred to as "sleeve" hereinafter) acting as a developer supplying means for supplying the toner along a longitudinal direction of the sleeve.

As shown in FIG. 6, the recording electrode assembly 1 includes a plurality of recording electrodes constituted by conductors disposed on a flexible print board 1*a* and closely spaced apart along an axial direction of the print board and covered by an electrode cover film 1*b*. The recording electrodes are connected to electrode drivers 1*d* (voltage applying means) held on an attachment plate 1*c*. Each recording electrode is provided at its free end with a conductor exposed portion 1*e* which contributes to the recording operation. The electrode driver 1*d* may be, for example, a VFD driver (MSG 1163 manufactured by Oki Electric Company, Japan). Further, a plurality of through holes 1*f* for passing the toner are formed in the print board 1*a* and the cover film 1*b* along an axial direction of the sleeve 3. The toner 2 conveyed on the sleeve 3 in direction shown by the arrows A passes through the through holes 1*f* to reach the conductive exposed portions 1*e* of the recording electrodes. The reference numeral 1*g* denotes connectors electrically connected to the electrode drivers 1*d*.

The toner 2 has a magnetic feature and is made of, for example, acrylic resin including magnetite of about 30~50% and carbon of about 2~10% so that the toner has a low electric resistance. Volume resistivity of the toner is $1\times10^2\sim1\times10^8$ Ωcm. and the voltage of 10 V~40 V is available to the recording operation.

A rotary magnet 4 is coaxially attached to the sleeve 3. The rotary magnet 4 is rotatingly driven around a shaft 4*a* by means of a drive motor (not shown), so that the toner 2 is conveyed along the outer peripheral surface of the sleeve 3 by an alternate magnetic field generated by the rotary magnet 4. The sleeve 3 and the rotary magnet 4 are contained in a developing device 7 shown in FIG. 5.

In the proximity of the recording electrode assembly 1, there is disposed an endless recording sheet (recording medium) 5 on which an image is formed by electrostatically adhering the toner 2 thereon and a portion of which is closely spaced apart from the recording electrode assembly. The recording sheet 5 is wound around and entrained by a pair of rollers (lower drive roller 6*a* and upper tension roller 6*b*). The drive roller 6*a* is driven by a drive motor (not shown) to shift the recording sheet 5 in a direction shown by the arrow B in FIG. 5.

As shown in FIG. 7, the recording sheet 5 comprises an outer layer 5*a* made of transparent material consisting of butylal resin or urethane resin as a main component, a colored layer 5*b* comprised of color inorganic material and binder (acrylic resin, plastic resin), a conductive layer 5*c* on which aluminium or ITO (oxide of indium and tin) for providing condictivity, and a substrate layer 5*d* made of plastic resin such as polyethylene terephthalete, polyethylene, polypropylene or the like, these layers 5*a*~5*d* being laminated.

The outer layer 5*a* and the colored layer 5*b* constitute a dielectric layer which is electrically insulated, and, as the inorganic material for the colored layer 5*b*, $TiO_2$, $Al_2O_3$ or $SnO_2$ is used to provide a white background screen.

Further, the dielectric layer has a thickness of 2~40 μm and volume resistivity of $1\times10^6 \sim 1\times10^{10}$ Ωcm, and the conductive layer 5*c* has a thickness of 800~1000 Å and volume resistivity of $1\times10^2$ Ωcm or less.

In FIG. 5, a record controlling portion 8 constituting a voltage applying means for applying voltages corresponding to image information to the recording electrodes 1 serves to apply a signal voltage corresponding to the image information to the conductive layer 5*c* of the recording sheet 5 to electrically adhere the toner 2 to the outer layer 5*a*, thus forming an image thereon.

The reference numeral 9 denotes an image display portion for displaying the image formed on the recording sheet 5; and 10 denotes a cleaning member attached to a rear wall 11 of the apparatus via a support member 11*a*. The cleaning member 10 is constituted by a cleaner body 10*a* and a soft conductive brush 10*b*. By slidingly contacting the brush 10*b* with the recording sheet 5 with appropriate orientation and distance, the toner 2 adhered to the recording sheet 5 can be removed from the recording sheet onto the sleeve 3. The cleaning member may be made of carbon fibers, soft conductive plastic compound (polyethylene, polypropylene), urethane rubber or silicone. Further, the cleaner body 10*a* of the cleaning member 10 is earthed to remove the charges on the toner 2 in an earthing direction as the cleaning member slidingly contacts the recording sheet 5. On an opposite side of the cleaning member 10 with respect to the recording sheet 5, there are arranged a non-magnetic member 12 for supporting the recording sheet 5 and a magnet 13.

A charge removing brush 14 serves to contact the recording sheet 5 for removing the residual charges remaining in the recording sheet 5. As shown in FIG. 7, the charge removing brush 14 contacts a low electric resistance material such as a carbon paste layer 5*e* coated on the conductive layer 5*c* of the recording sheet 5 to remove the residual charges.

The toner 2 adhered to the peripheral surface of the sleeve 3 by the action of the rotary magnet 4 passes through the through holes 1*d* of the print board 1*a* and is fed onto the recording electrodes 1. In this case, by applying the voltage to the recording electrodes in response to the image information, the toner 2 can be adhered to the recording sheet 5 to form the image. Incidentally, the toner 2 on the recording electrodes 1 which did not contribute to form the image is dropped from the sleeve 3, so as not to interfare with the image formed on the recording sheet 5.

The image formed on the recording sheet 5 is displayed at the display portion 9 when the recording sheet 5 is shifted in the direction B in FIG. 5 by means of the drive roller 6*a*. The recording sheet 5 passed through the display portion 9 is contacted by the charge removing brush 14 to remove the residual charges, and is swept by the cleaning member 10, so that the toner 2 is removed from the recording sheet. The removed toner 2 drops on the sleeve 3 to be re-used in the next recording process.

Next, an image forming operation regarding the recording sheet 5 will be explained with reference to FIG. 1.

In FIG. 1, by rotation of the rotary magnet 4 disposed in the stationary sleeve 3, the toner 2 is conveyed in the direction shown by the arrow A and passes through the through holes 1*f* of the recording electrode assembly 1 and flows on the flexible electrode cover film 1*b* to reach the conductor exposed portions 1*e*.

Free ends of the conductor exposed portions 1*e*, which are disposed at a downstream side in a toner moving direction, are coated by a coating member 1*h* made of insulative material, so as to reduce a distance between the recording electrodes 1 and the recording sheet 5. The toner 2 fed onto the conductor exposed portions 1*e* is blocked or dammed by the coating member 1*h* so that the toner is temporarily accumulated. In this point, by applying the voltages to the recording electrodes 1 in response to the image information, the toner 2 is adhered to the recording sheet 5 to form the image thereon.

Further, in order to immediately remove the toner 2 which did not adhere to the recording sheet 5 after the recording operation from the recording electrodes 1, a recording electrode supporting member 1*i* is interposed between the sleeve 3 and the recording electrode assembly 1 to provide a head or fall h.

In the illustrated embodiment, the head h (i.e., a distance between the conductor exposed portions 1*e* and the surface of the sleeve 3) was 0.6~0.8 mm, a length l of each conductor exposed portion was 1.5~3.0 mm, and a length c of the coating member 1*h* was equal to or less than a half of the length l of the conductor exposed portion ($c \leqq l/2$). The reason is that, if the length of the coating member 1*h* is more than the half of the value 1, an amount of the toner 2 adhering to the recording sheet 5 is decreased, thus reducing the image density.

Incidentally, the recording electrode assembly 1 is fixed to the sleeve 3 in such a manner that the free ends of the conductor exposed portions 1*e* are spaced apart from a line connecting between centers of the tension roller 6*b* and of the rotary magnet 4 by a distance a.

Next, a relationship between a thickness b of the coating member 1*h* and a distance d between the coating member 1*h* and the recording sheet 5 will be explained with reference to the graph shown in FIG. 2.

According to FIG. 2, it can be understood that, as the thickness b of the coating member 1*h* is increased, the distance d between the coating member 1*h* and the recording sheet 5 can be increased.

Particularly, within a range 200 μm≦b≦300 μm, the distance d becomes 550 μm (d=550 μm), with the result that the distance d between the coating member 1*h* and the recording sheet 5 can be widened by 150 μm at the maximum in comparison with the case of no coating member 1*h* (b=0 μm, d=400 μm). Accordingly, as shown in the above graph, in the illustrated embodiment, it was found that the distance d between the coating member 1*h* and the recording sheet 5 could be widened until the thickness b of the coating member 1*h* reached about 400 μm.

The reason will be considered with reference to FIGS. 3A, 3B, 4A and 4B.

Figure 3A:
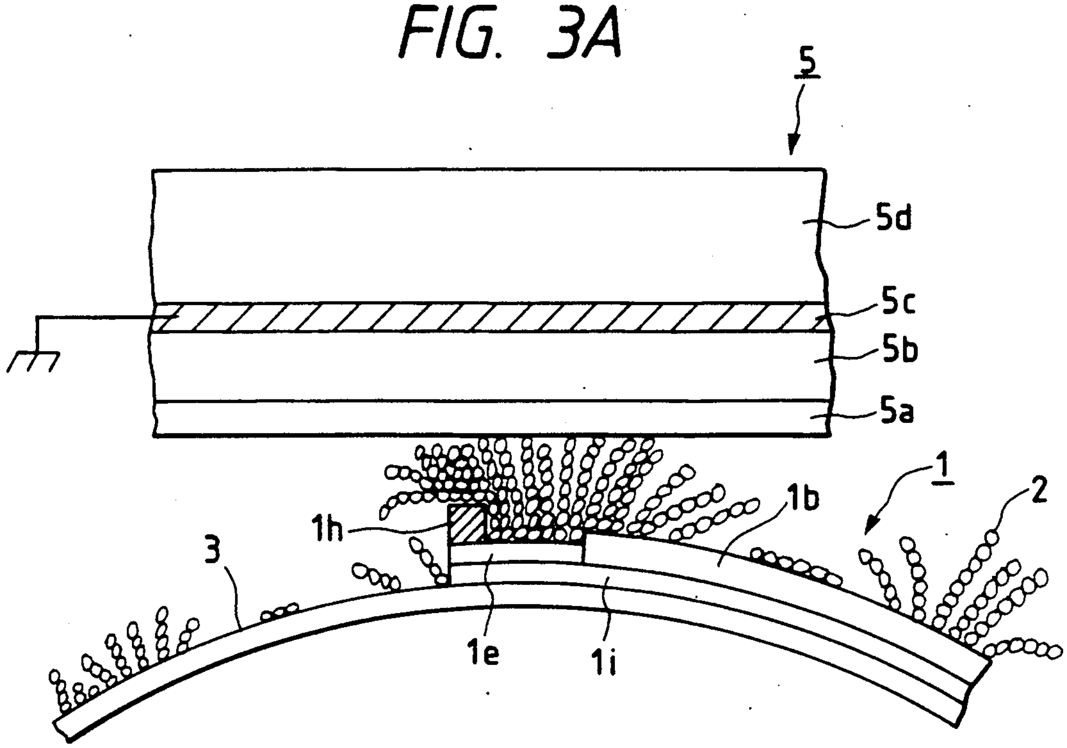
FIGS. 3A, 3B, 4A and 4B are explanatory views for explaining the principle of the image forming portion.

First of all, in FIG. 3A, the toner 2 used in the illustrated embodiment has the magnetic feature and has the low electric resistance (volume resistivity of $1\times10^2 \sim 1\times10^8$ Ωcm). Further, the toner 2 forms toner chains 2*a* along the lines of magnetic force of the rotary magnet 4, and the toner particles are attracted to each other by the magnetic force. Accordingly, since the stronger the magnetic force the greater the contacting area or contacting force between the toner particles, the value of the resistance is decreased, thus facilitating the developing operation.

Figure 3B:
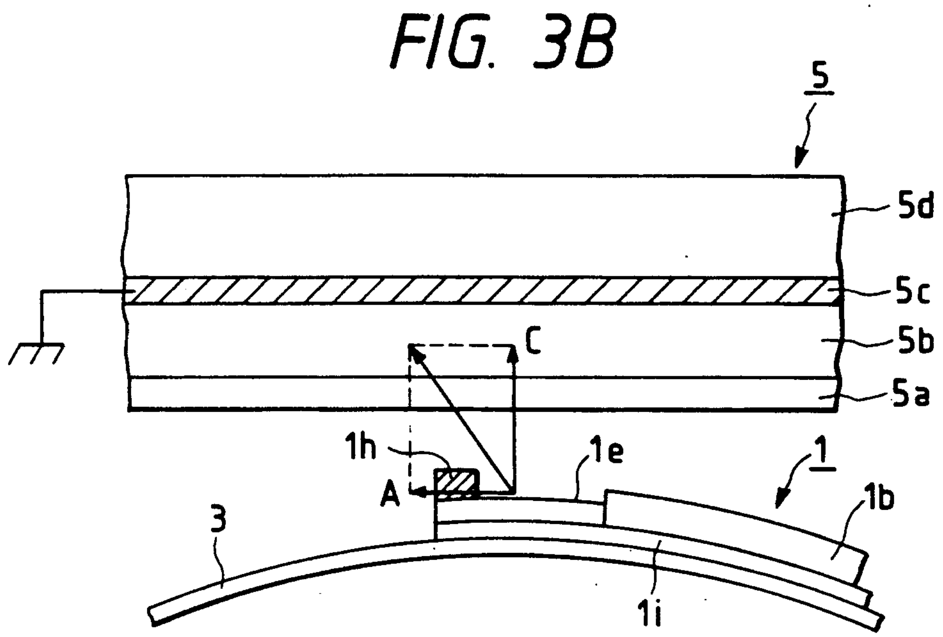

However, in the illustrated embodiment, as shown in FIG. 3B, it was found that the force for decreasing the resistance value of the toner acts not only along the direction of the line of magnetic force (direction shown by the arrow C) but also along the toner moving direction (direction shown by the arrow A).

By the rotation of rotary magnet 4, the toner 2 is conveyed from an upstream side of the recording electrodes 1, and, since the distance between the recording electrodes 1 and the recording sheet 5 is abruptly decreased, an amount m of toner after passing the recording electrodes 1 (amount per unit time and per unit area) will be smaller than an amount M of toner before passing the recording electrodes. Accordingly, in the proximity of the recording electrodes 1, an amount (M−m) of toner is accumulated per unit time. Thus, a force is also generated in the toner moving direction A, which force is represented by $P_A$.

$$\text{That is, } P_A=f_2\,(M-m).\ (f \text{ is a function}) \tag{1}$$

Further, the above-mentioned force generated in the direction of the line of magnetic force is represented by $P_C$.

$$\text{That is, } P_C=f_1(G)\ (G \text{ is magnetic flux density}) \tag{2}$$

The force generated on the recording electrode 1 can be expressed as the following vector:

$$|\vec{P}|=|\vec{P_C}|+|\vec{P_A}|=f_1(G)+f_2(M-m). \tag{3}$$

Further, the developing ability directly relates to the resistance value R of the toner 2, and, in order to facilitate the developing operation, i.e., to increase the amount of toner adhering to the recording sheet 5, the resistance value R must be decreased. Now, as shown in FIG. 4B, as the pressure P applied to the toner 2 is increased, the toner volume resistance value R is decreased. Thus, this relation can be represented by the following equation:

$$R=1/f_3\,(P). \tag{4}$$

Accordingly, from the above equations (3) and (4), the following relation can be obtained:

$$R=1/f_3\,(P_C+P_A)=1/f_3\{f_1(G)+f_2(M-m)\}. \tag{5}$$

As shown in the illustrated embodiment, by providing the coating member 1*h* on the free ends of the conductor exposed portions 1*e* of the recording electrodes 1, the toner is dammed during the movement thereof, with the result that the toner amount m' after passing the recording electrodes 1 will be less than the toner amount m in the case of no coating member 1*h*.

That is to say, due to m'<m, since $f_2$ (M−m') becomes greater in the equation (5), the resistance value R' will be decreased. Accordingly, the following relation can be obtained:

$$R'=1/f_3\,(P_C+P_A')=1/f_3\{f_1(G)+f_2(M-m')\}. \tag{6}$$

$$R'<R$$

As mentioned above, since the coating member 1*h* is provided on the free ends (at the downstream side in the toner moving direction) of the conductor exposed portions 1*e*, the greater pressure acts on the accumulated toner by the movement of the toner 2, thus decreasing the toner resistance value R. As a result, it is possible to facilitate the developing operation, and therefore, to increase the toner amount adhering to the recording sheet 5.

Figure 4A:
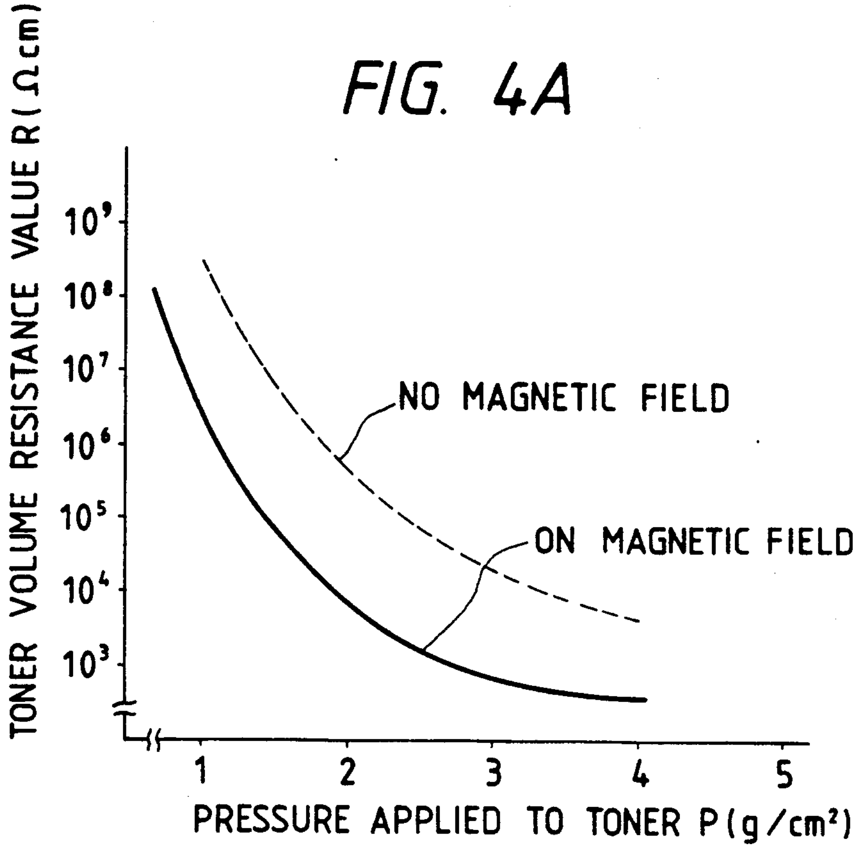
Figure 4B:
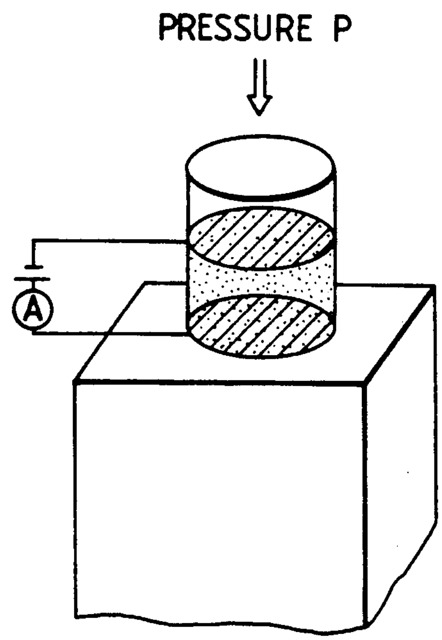

The graph shown in FIG. 4A shows the relation between the toner volume resistance value and the pressure applied to the toner, which relation is obtained by filling a cylindrical container shown in FIG. 4B with the toner, by pressurizing the toner from the top thereof in both cases where it is positioned on the magnetic field and where it is positioned in an area having no magnetic field, and at the same time by sandwiching the toner with upper and lower metallic electrodes, and by seeking the resistance value R from the applied voltage (30 V) and the current value.

Incidentally, an inner diameter of the cylindrical container was 1 cm, an initial height of the toner in the container was 1 cm, and the magnetic flux density immediately above the surface of the magnet for forming the magnetic field was 800~900 Gauss.

As seen from the graph shown in FIG. 4A, even in the case of no magnetic field, when the pressure is applied, the resistance value R of the toner is decreased. In the illustrated embodiment, it was found that such pressure was caused by the toner being conveyed on the sleeve 3.

An ordinate of the graph shown in FIG. 4A indicates the toner volume resistance value R which is represented by the following equation:

$$\begin{aligned} R &= V/i \times S/h \\ &= 30/i \times (0.5\text{ cm} \times 0.5\text{ cm} \times 3.14)/1\text{ cm} \\ &= 23.5/i\ \Omega\text{cm}. \end{aligned}$$

The toner volume resistance value R was determined by measuring the current value i. Further, the pressure P was measured by resting weights on the upper electrode in a range of 0.5~5 grams.

With the above-mentioned arrangement, since it is possible to increase the distance d between the coating member 1*h* and the recording sheet 5, the eccentric rotation of the tension roller 6*b* caused by the shifting movement of the recording sheet 5 can be compensated, and, thus, the manufacturing cost of the apparatus can be reduced since the manufacturing accuracy of the part (tension roller) can be roughly selected.

Further, since the attaching accuracy of the electrode supporting member 1*i* and of the recording electrodes 1 can also be compensated, the yield can be improved, thus decreasing the manufacturing cost. For example, by compensating the attaching accuracy of the recording electrodes 1 by 20~50 μm (up and down) at the maximum, the attachment operation of the recording electrodes can be facilitated, thus improving the yield up to 50~80%.

In addition, since the accuracy of the straightness of the sleeve 3 can also be compensated, it is possible to improve the yield of the manufacture of the sleeve 3 and to reduce the manufacturing cost. For example, by compensating the accuracy of the straightness of the sleeve 3 by 70~100 μm, the yield can be improved up to 70~90% or more. Since the accuracy of various parts can be compensated as mentioned above and more dimensional errors during assembling can be permitted in comparison with conventional cases, the assembling ability can also be improved.

Further, it is possible to prevent damage due to the contact between the recording sheet 5 and the recording electrodes 1 (including the coating member 1*h*), thus improving the reliability of the image forming apparatus.

Next, other embodiments of a coating member 1*h* provided regarding the conductor exposed portions 1*e* of the recording electrodes 1 will be explained with reference to FIGS. 8 and 9.

Figure 8:
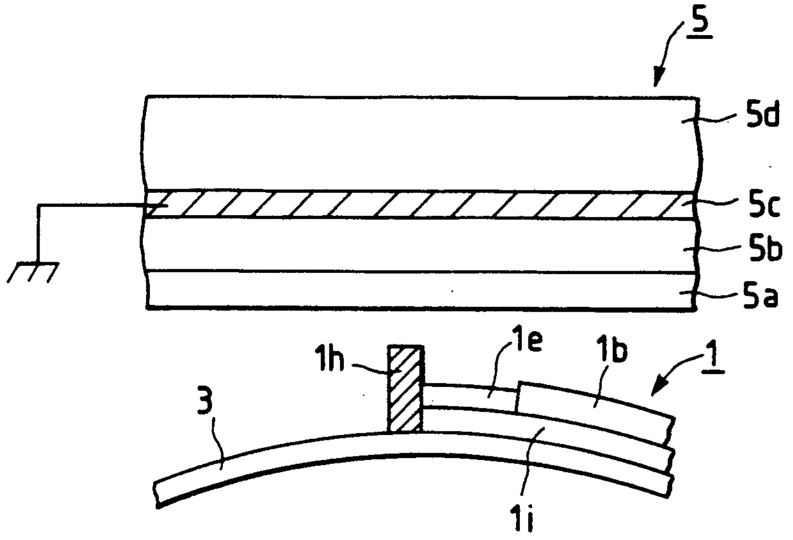
FIGS. 8 and 9 are sectional views showing other embodiments.

In an embodiment shown in FIG. 8, the coating member 1*h* is formed on the sleeve 3 in the proximity of the free ends of the recording electrodes 1 which are disposed at the downstream side in the toner moving direction, rather than formed on the conductor exposed portions 1*e*.

With this arrangement, since the coating member 1*h* does not cover any parts of the recording electrodes 1, all of the areas of the conductor exposed portions 1*e* can be used for the recording operation, and, therefore, it is possible to widen the distance between the recording electrodes 1 and the recording sheet 5 and to maintain the image density.

Figure 9:
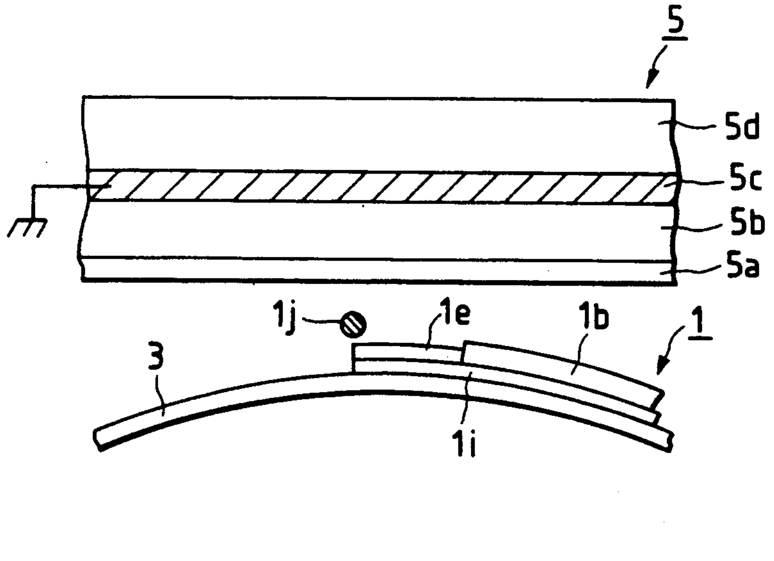
Figure 10:
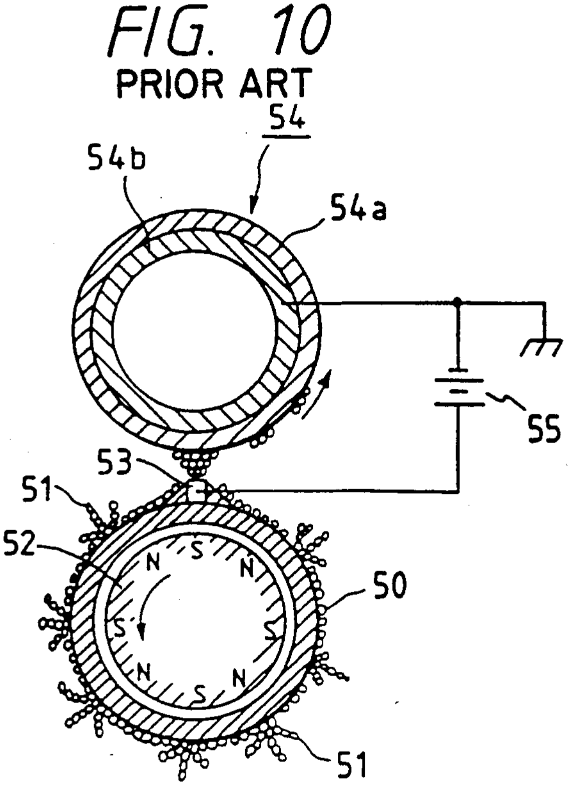
FIG. 10 PRIOR ART
FIGS. 10 and 11 are sectional views of a conventional image forming apparatus.
Figure 11:
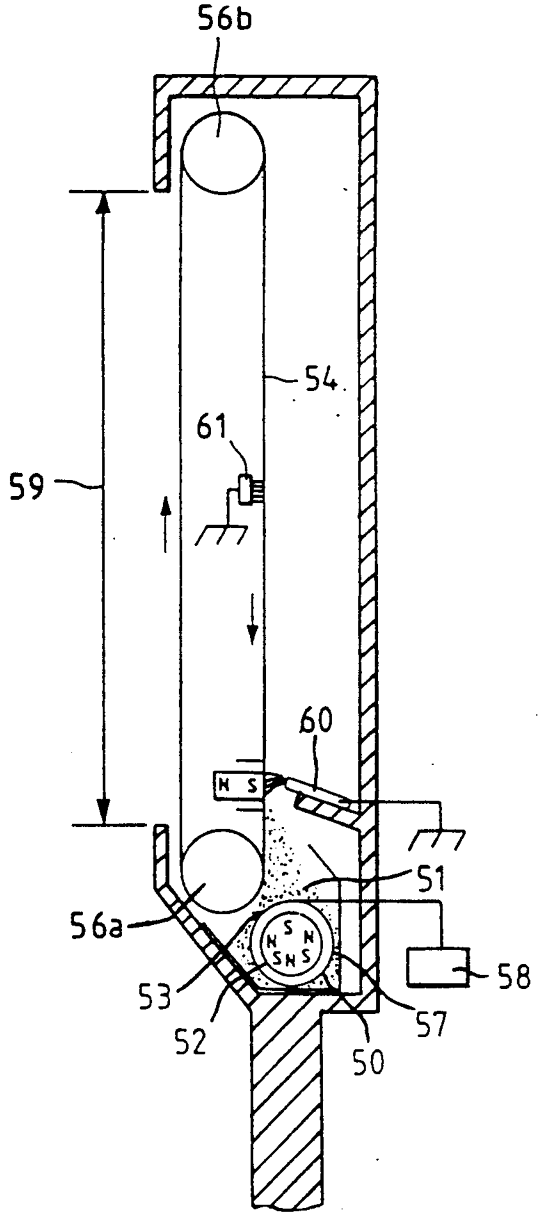
FIG. 11 PRIOR ART

Next, in an embodiment shown in FIG. 9, as the coating member, an insulative fine wire 1*j* is disposed between the conductor exposed portions 1*e* and the recording sheet 5.

For example, when the fine wire 1*j* has a diameter of 250 μm, it is possible to widen the distance between the recording electrodes 1 and the recording sheet 5 up to 400~550 μm, thus providing the same technical effect as the previous embodiment.

Incidentally, the fine wire 1*j* may be disposed in spaced relation to the recording electrodes 1. In this case, if the recording sheet 5 temporarily contacts the fine wire 1*j*, since the fine wire can escape from the recording sheet, the latter is not damaged by the fine wire.

As mentioned above, according to the present invention, since a prevention means for preventing the developer from shifting is provided at the downstream side of the conductor exposed portions of the recording electrodes in the developer moving direction, it is possible to accumulate an adequate amount of developer between the conductor exposed portions and the recording medium. Thus, it is possible to further reduce the electric resistance value between the developer particles, thus increasing the amount of developer adhering to the recording medium.

Accordingly, since it is possible to widen the distance between the recording electrodes and the recording medium and to compensate the manufacturing accuracy of the constructural parts of the apparatus and the assembling errors, it is possible to improve the yield of the parts and the assembling ability, thus reducing the manufacturing cost of the apparatus. Further, it is also possible to prevent damage due to contact between the recording electrodes and the recording medium, thus improving the reliability of the apparatus.

Next, another embodiment will be explained in consideration of problems that arise at the upstream side of the recording electrodes.

Figure 12:
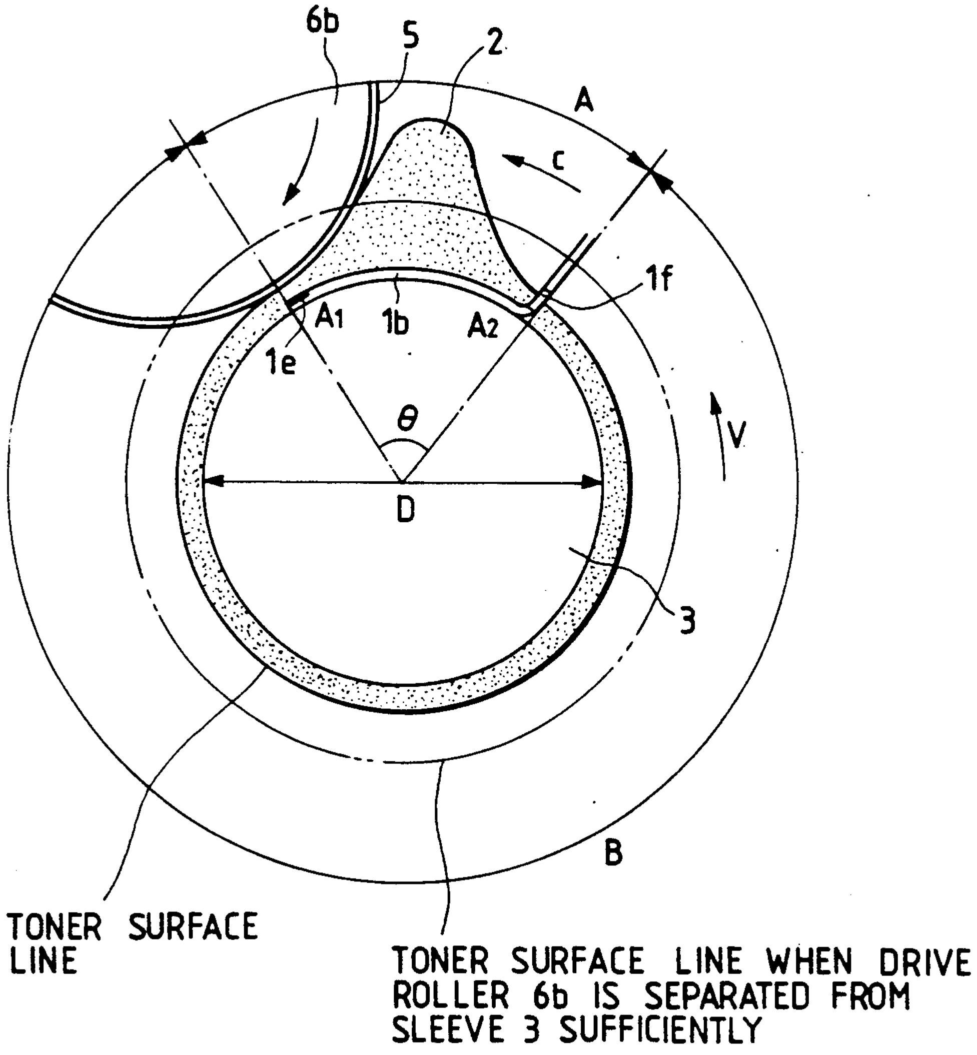
FIG. 12 is an explanatory view for explaining a conventional image forming principle.

FIG. 12 schematically shows the positional relation between the constructural parts only in consideration of the upstream side of a recording position.

As shown in FIG. 12, the explanation will be continued, by dividing the surface of the sleeve 3 into a portion A (between the through opening 1*f* and the conductor exposed portion 1*e*; an angle of center regarding sleeve 3 is $\theta$) and a portion B (between the conductor exposed portion 1*e* and the through opening 1*f*; an angle of center regarding the sleeve 3 is $(2\pi-\theta)$). Incidentally, W denotes the total weight of the toner disposed on the sleeve surface; V denotes a toner feeding speed; $A_1$ denotes a cross-sectional area between the recording sheet and the conductor exposed portion; $A_2$ denotes the total area of the through opening; $\rho$ denotes the toner density; and D denotes a diameter of the sleeve. With adequate separation between the recording sheet 5 and the sleeve 3, the toner 2 on the surface of the sleeve 3 is moved at a steady state by rotating the rotary magnet 4.

Then, the recording sheet 5 is advanced toward to the sleeve 3 to set a predetermined gap between the recording sheet 5 and the conductor exposed portion 1*e*. After a time t is elapsed, the toner amounts $W_A$, $W_B$ disposed on the portions A and B, respectively, will be as follows:

At the portion A, $$W_A = W\times\theta/2\pi + \rho(A_2-A_1)Vt;$$

At the portion B, $$W_B = W\times(2\pi-\theta)/2\pi - \rho(A_2-A_1)Vt.$$

Now, since the toner 2 is circulated on the sleeve 3, when a time required for effecting one revolution of the toner 2 around the sleeve 3 is $t_1$, the following equation is obtained:

$$t_1 = \pi D/V.$$

And, after the time $t_1$ is elapsed, the toner amounts $W_{At}$, $W_{Bt}$ will be as follows:

$$W_{At} = W\times\theta/2\pi + \rho(A_2-A_1)\pi D; \text{ and}$$

$$W_{Bt} = W\times(2\pi-\theta)/2\pi - \rho(A_2-A_1)\pi D.$$

Incidentally, $A_2 > A_1$. Thus, the toner amounts will be steady state.

Figure 13:
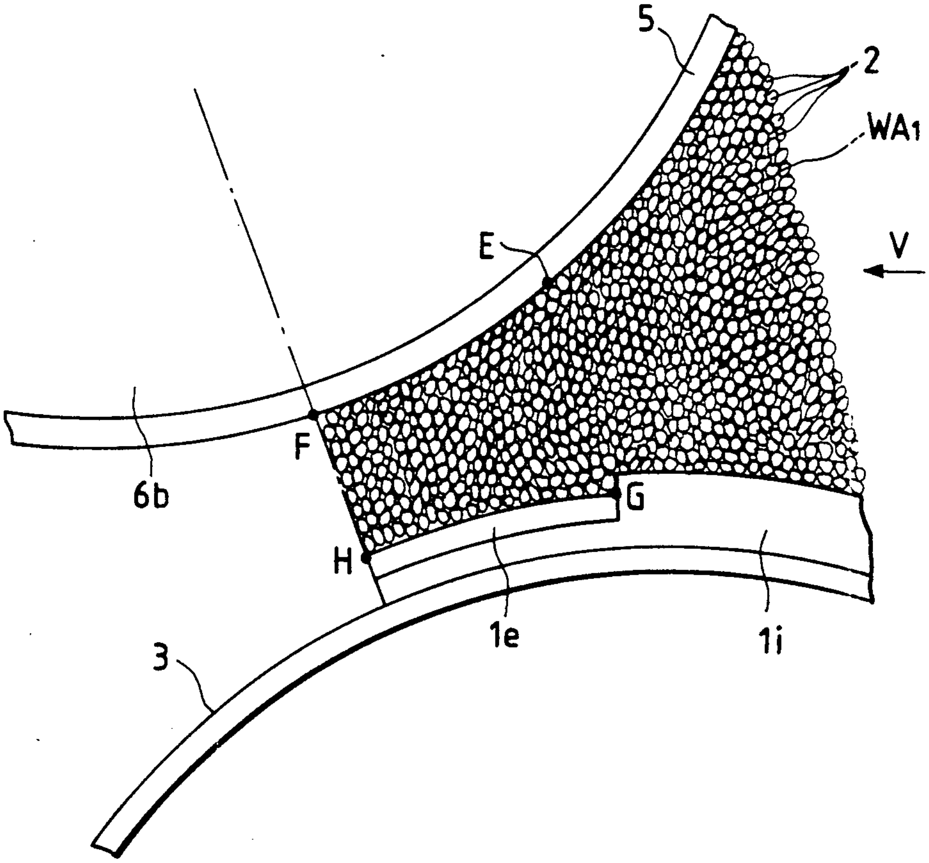
FIG. 13 is an enlarged sectional view for explaining a conventional image forming portion.

FIG. 13 shows, in an enlarged scale, a condition that the toner 2 accumulated in the image forming portion became steady state.

Now, when starting point and terminal point of an image effective area along the toner feeding direction are E and F at the side of the recording sheet 5, respectively, and are G and H at the side of the conductor exposed portion 1*e*, respectively, the force exerted on the toner 2 in the image effective area EFGH will be considered.

Figure 14:
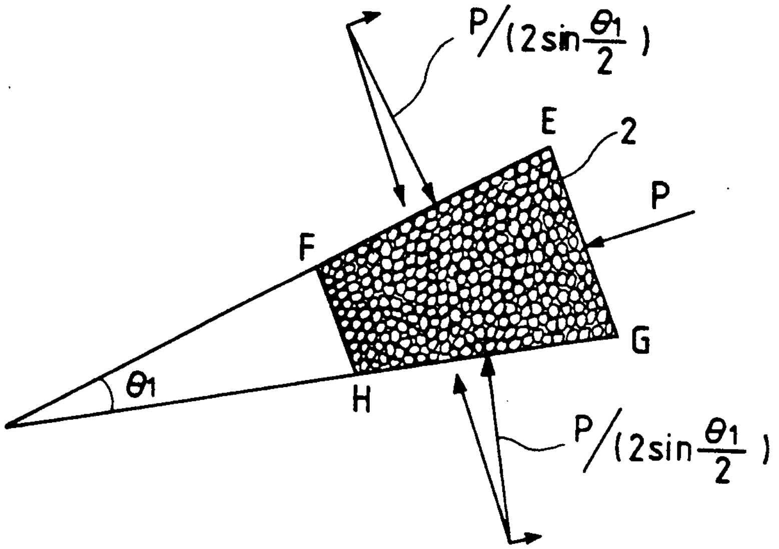
FIG. 14 is an explanatory view for explaining a conventional image effective area.

When the configuration of the image effective area EFGH is resembled as a quadrilateral EFGH as shown in FIG. 14, and an angle between a line segment EF and a line segment GH is $\theta_1$, the quadrilateral EFGH will be a portion of a wedge directed toward the toner moving direction. When a force P acts in a direction perpendicular to the line segment EG, the toner 2 in the quadrilateral EFGH will be subjected to forces P/2 (sin $\theta_1/2$) acting in directions perpendicular to the line segments EF, GH, respectively.

Since the toner 2 is accumulated ahead of the conductor exposed portion 1*e* and the weight thereof becomes $W_{At}$ after the time $t_1$ is elapsed as mentioned above, the force P can be reversed as to a force generated when an object having the weight of $W_{At}$ strikes a wall at a speed of V (i.e., $P \propto W_{At}V$). Thus, when the toner 2 in the image effective area EFGH is accumulated at the conductor exposed portion 1*e*, the toner is subjected to a compression force of P/2 (sin $\theta_1/2$).

On the other hand, as the toner 2 is compressed, the toner resistance tends to be reduced. That is to say, when the toner 2 in the image effective area EFGH is dammed at the conductor exposed portion 1*e*, the toner resistance $R_1$ is more reduced than that when the toner is not dammed or accumulated, with the result that the electrostatic attraction force $F_E$ is increased. By decreasing the toner resistance $R_1$ lower than a predetermined value $RM_1$, the electrostatic attraction force $FE_1$ acting on the toner chain becomes greater than a magnetic force $F_M$ of the rotary magnet 4 tending to hold the toner chain at the side of the sleeve 3, thereby increasing an amount of toner 2 attracted to the recording sheet 5.

However, with the above-mentioned arrangement, since the toner 2 is dammed or accumulated to reduce the toner resistance $R_1$ lower than the predetermined value $R_M$, the toner speed V must be set above a predetermined value $V_M$ and the gap area $A_2$ must be set below a predetermined value $A_{2M}$. The reason is that, when f is a function representative of the toner resistance, the following relation is established:

$$f\{P/2(\sin\theta_1/2)\} = f\{W_{At}V/(\sin\theta_1/2)\} = f\{g(A_2 - A_1)V/(\sin\theta_1/2)\} < R_M.$$

Accordingly, in FIG. 12, since the driving force of the motor required for driving the magnet roller 4 to feed the toner must be increased more than a predetermined level, it was feared that the power consumption was increased and the apparatus was large-sized.

Further, since the dimension of the gap between the recording medium 5 and the conductor exposed portion 1*e* has, of course, an upper limit, it was feared that the constructural elements such as the drive feed roller 6*b*, sleeve 3 and the like had to be manufactured with high accuracy, thus increasing the manufacturing cost.

In addition, when the longitudinal dimension of the apparatus is increased, since the manufacturing accuracy of the elements such as the drive feed roller 6*b*, sleeve 3 and the like often decreases, the gap between the recording medium 5 and the conductor exposed portion 1*e* must be set to have a greater value. In this case, however, since the resistance $R_1$ of the toner chain is increased in proportion to the increase in the gap value, it was necessary to devise for obtaining the relation $R_1 \leqq R_M$. In order to obtain such relation, conventionally, the toner feeding speed V may be increased, or the vertex angle $\theta_1$ of the wedge having the quadrilateral shape EFGH may be decreased by increasing outer diameters of the drive feed roller 6*b* and the sleeve 3 to increase the toner compressing force.

However, in the former case, the driving force of the motor for driving the rotary magnet 4 had to be increased, thus making the apparatus itself bulky, with the result that it was feared that weight of the apparatus was increased and the power consumption was also increased. On the other hand, in the latter case, i.e., when the outer diameters of the drive feed roller 6*b* and the sleeve 3 were increased, the recording condition was improved at the conductor exposed portion 1*e*. However, it was feared that an area sweeping the toner 2 adhered to the recording medium 5 was increased, thus creating an uneven image.

Further, in order to widen the gap distance, the magnetic force of the rotary magnet 4 may be increased, and, in this case, the magnet is preferably made of resin or rubber in consideration of the lightness of the magnet. However, in this case, since the maximum magnetic flux density immediately above the surface of the magnet becomes 1000~1200 Gauss and the image can be formed on the recording sheet 5 by positively contacting the toner chains on the recording electrodes 1 with the recording sheet 5 only when the distance between the conductor exposed portions 1*e* and the recording sheet 5 is 400 μm at most, if the apparatus is large-sized, it is difficult to maintain the distance between the conductor exposed portions le and the recording sheet 5 to 400 μm due to the discrepancy in the manufacturing accuracy of parts of the apparatus. For example, due to the imperfect straightness of the sleeve 3, imperfect straightness of the recording electrodes 1, and the distortion of the drive feed roller 6*b* and tension roller 6*a*, it was feared that the recording electrodes 1 would contact the recording sheet 5 to damage them.

Now, another embodiment of the present invention which can solve the above problems including ones that arises at the upstream side of the recording position will be explained.

Figure 15:
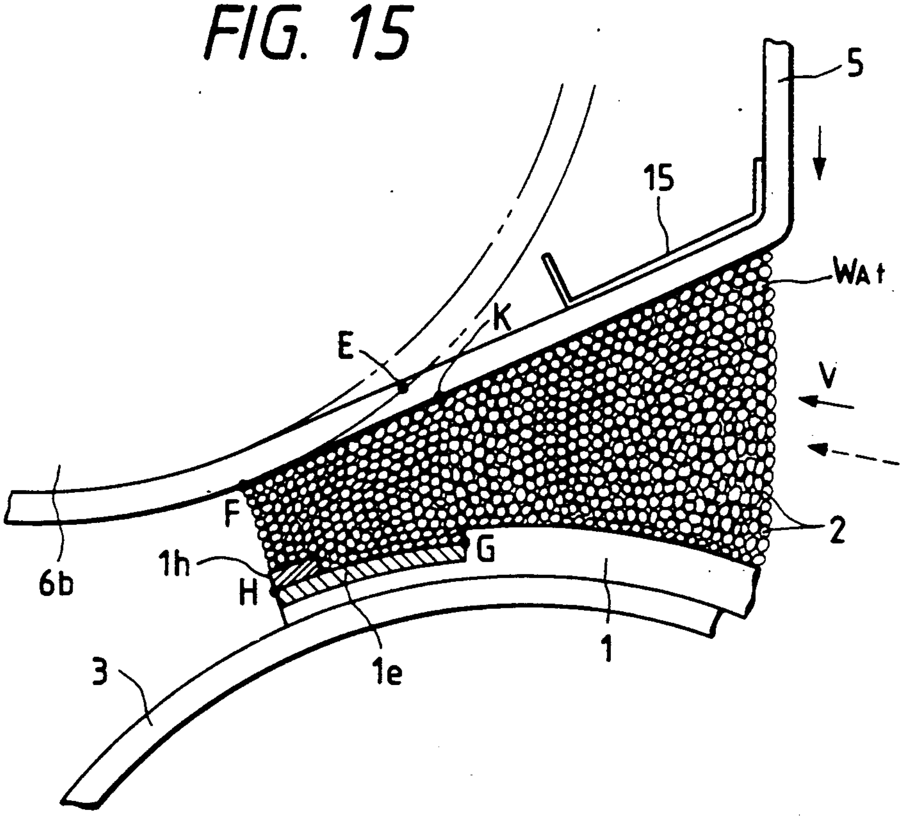
FIG. 15 is an enlarged sectional view for explaining an example of the image forming portion.
Figure 16:
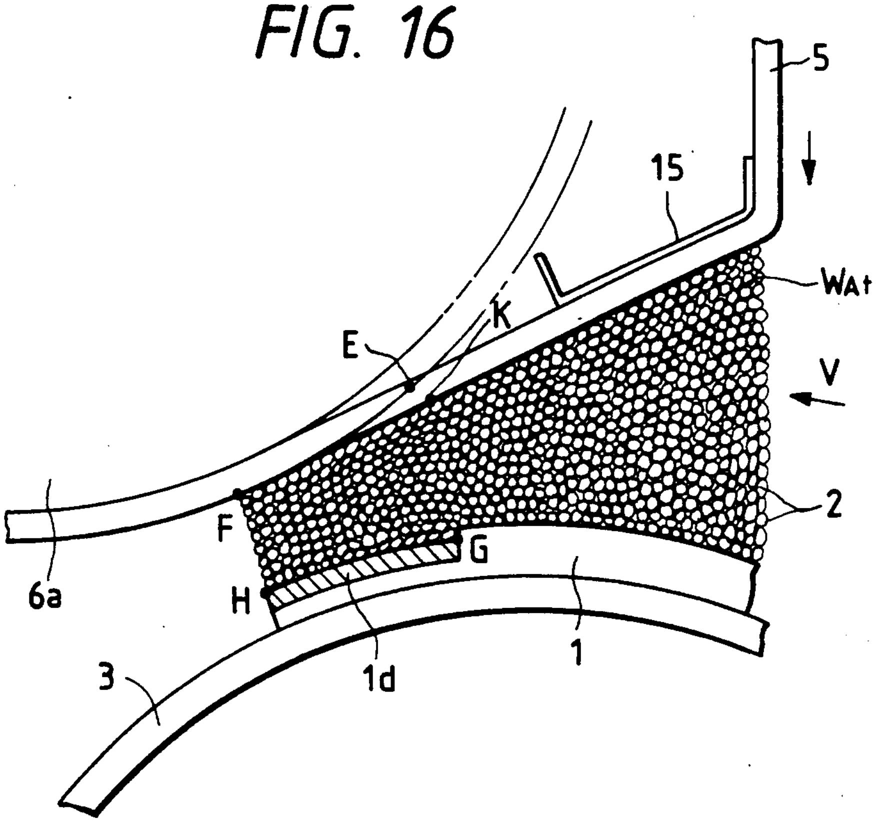
FIG. 16 is an enlarged sectional view for explaining another example of the image forming portion.
Figure 17:
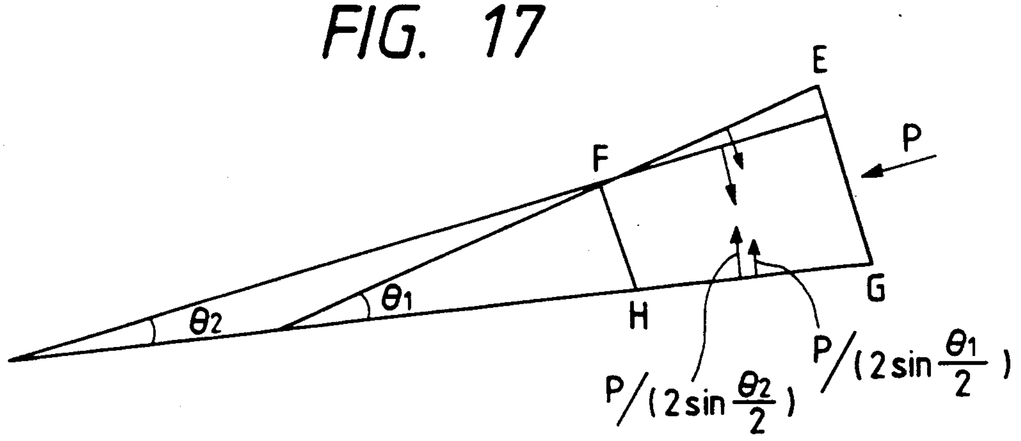
FIG. 17 is an explanatory view for explaining an image effective area.

FIGS. 15 to 17 show, in an enlarged scale, an image forming portion. Particularly, FIG. 15 is an enlarged sectional view showing the recording electrodes and thereabout, which represent the characteristic of this embodiment. In FIG. 15, the recording sheet 5 and the toner 2 are moved in directions shown by the arrows, and the toner moving direction is shown by the broken arrow. The insulative coating member 1*h* for damming the toner is disposed on the free ends of the conductor exposed portions 1*e* of the recording electrodes 1 and a guide member 15 is arranged in the proximity of and at an upstream side of the conductor exposed portions 1*e* in the toner moving direction. The guide member 15 serves to guide the recording sheet 5 driven by the drive roller 6*b* and the tension roller 6*a* and to direct the recording sheet 5 so that the toner being fed between the recording electrodes 1 and the recording sheet 5 is compressed. The coating member 1*h* and the guide member 15 constitute a compression means for compressing the developer accumulated near the recording electrodes 1.

The characteristic of the illustrated embodiment is that the compression force acts on the toner by guiding the recording sheet 5 by means of the guide member 15 in the vicinity of and at the upstream side of the conductor exposed portions 1*e* in the toner moving direction (i.e., near the developing area) and the similar compression force acts on the toner by providing the coating member 1*h* on the free ends (at the downstream side in the toner moving direction) of the conductor exposed portions 1*e*.

Now, the reason will be described in connection with (a) the effect of the guide member 15 provided at the upstream side of the conductor exposed portions 1*e* in the toner moving direction and (b) the effect of the coating member 1*h* provided on the free ends of the conductor exposed portions at the downstream side in the toner moving direction. Incidentally, in the arrangement according to the illustrated embodiment, as shown in FIG. 15, while the toner compressing means is provided both at the upstream side and at the downstream side of the conductor exposed portions in the toner moving direction, even if the toner compressing means is provided either at the upstream side or at the downstream side of the conductor exposed portions, the toner can be adequately compressed.

(a) Effect of the Guide Member 15

The construction of the image forming portion will be explained with reference to FIGS. 16 to 23. Since the amount of toner entering into the image forming portion through the through holes *1f* is greater than the amount of toner leaving from the image forming portion through the gap between the recording sheet 5 and the conductor exposed portions 1*e*, the toner 2 is accumulated ahead of the conductor exposed portions 1*e* of the recording electrodes 1. That is effective to increase the toner density for obtaining the image having a desired image density.

Figure 19:
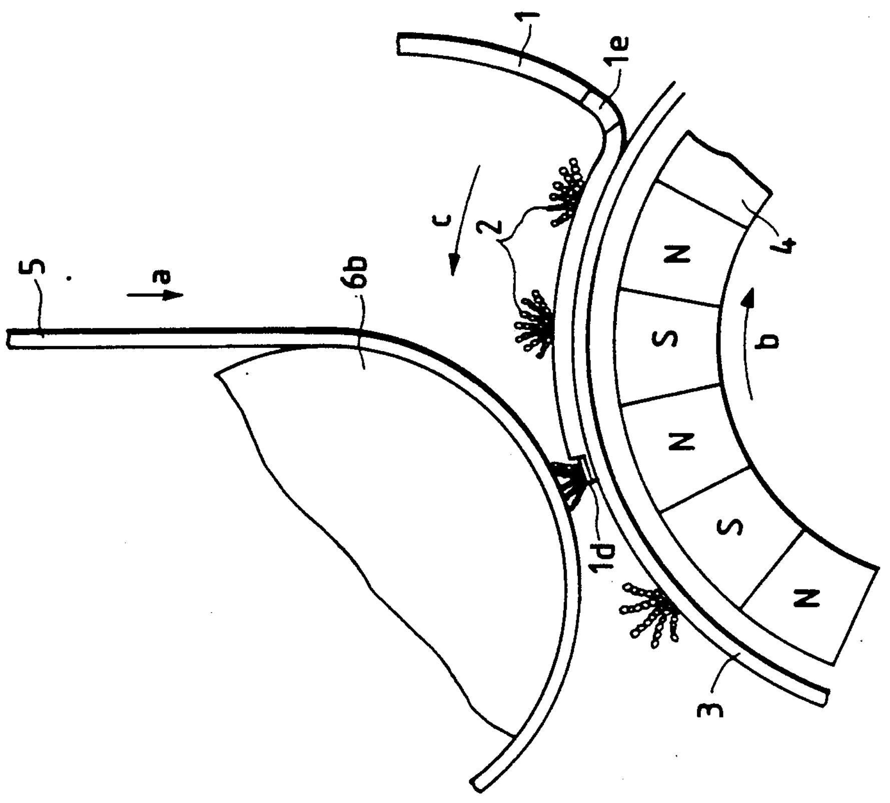

In this way, the reasons why the image density is increased when the toner is accumulated are that (1) the amount of toner contacting the image effective area of the recording sheet 5 is increased and that (2) the electrostatic attraction force between the recording sheet 5 and the toner 2 is increased to increase the amount of toner to be adhered to the recording sheet 5. Now, these reasons will be fully explained in comparison with the case where the toner is not accumulated. Incidentally, in this comparison, the above-mentioned prevention means for preventing the toner from shifting will be neglected. (1) Reason why the amount of toner contacting the image effective area of the recording sheet 5 is increased:

The toner 2 on the conductor exposed portions 1*e* forms toner chains along lines of magnetic force generated by the rotary magnet 4. In this case, since a distance between the surface of the rotary magnet 4 and the recording sheet 5 is greater than a distance between the surface of the rotary magnet 4 and the conductor exposed portions 1*e*, the magnetic flux density on the recording sheet 5 is weaker than that on the conductor exposed portions 1*e*, with the result that, as shown in FIG. 19, the toner chains are flared on a surface of the recording sheet 5. Under this condition, when the voltage corresponding to the image information is applied between the conductor exposed portions 1*e* and the conductive layer 5*c* of the recording sheet 5, since there arise regions where the free ends of the toner chains do not contact the recording sheet 5 on the image effective area of the recording sheet facing the conductor exposed portions 1*e*, the image density will be reduced when an all black image is formed.

Figure 20:
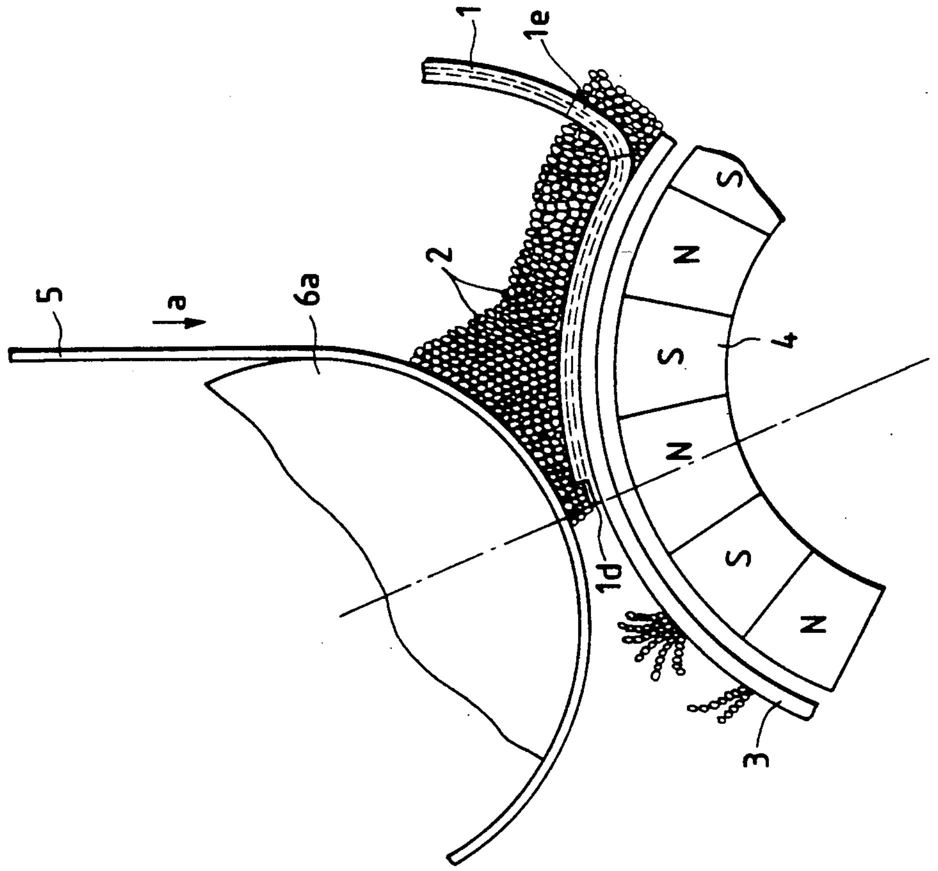
FIGS. 19 and 20 are sectional views for explaining the principle of the image forming portion.

Thus, as shown in FIG. 20, when the toner 2 is accumulated ahead of the conductor exposed portions 1*e* as the toner is conveyed, since the toner can also enter into the regions where the free ends of the toner chains do not contact the recording sheet 5 on the image effective area, such regions are diminished, whereby the image density will be increased even when an all black image is formed.

Figure 21:
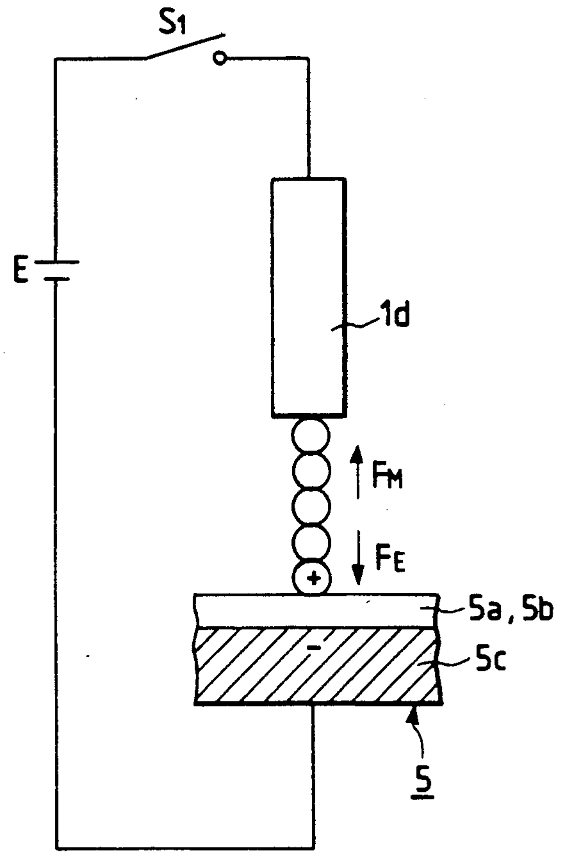
FIGS. 21 and 22 are schematic explanatory views of the image forming portion.

(2) Reason why the electrostatic attraction force between the recording sheet 5 and the toner 2 is increased:

FIG. 21 is a schematic explanatory view of the image forming portion showing a condition that the conductor exposed portion 1*e* is connected to the recording sheet 5 by the toner chain.

When a switch $S_1$ is closed to apply the plus charge to the toner 2, the minus charge is led to the conductive layer 5*c* of the recording sheet 5, with the result that the electrostatic attraction force $F_E$ is generated between the toner 2 and the recording sheet 5. On the other hand, the toner chain is subjected to a force $F_M$ acting in a direction opposite to the electrostatic attraction force $F_E$, by means of the magnetic field of the rotary magnet 4. By selecting the parameters to have the relation $F_E > F_M$, the toner on the free end of the toner chain can be electrostatically adhered to the surface of the recording sheet 5.

Figure 22:
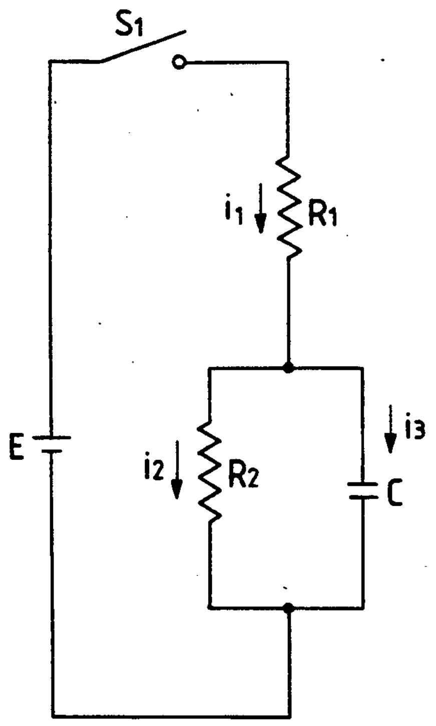

The above-mentioned electrostatic attraction force $F_E$ will further be considered with reference to FIG. 22 showing the image forming portion as a sham electric circuit. In FIG. 22, $R_1$ denotes a conductor resistance of the toner chain between the recording sheet 5 and the recording electrode 1; $R_2$ denotes the resistance of the recording sheet 5 as the conductor; C denotes the electrostatic capacity of the recording sheet 5 as the dielectric; E denotes the recording voltage; and $i_1$, $i_2$, $i_3$ denote currents flowing through the resistors $R_1$, $R_2$ and capacitor C, respectively.

When the switch $S_1$ is turned ON, the following relations are established:

$$R_1 i_1 + R_2 i_2 = E,$$

$$1/C \int i_3 dt = R_2 i_2.$$

When a time t is elapsed after the switch $S_1$ has been turned ON, the voltage Ec applied to both ends of the capacitor C will be as follows:

$$Ec = R_2 i_2 = R_2 E/(R_1 + R_2)(1 - \epsilon^{-\frac{R_1+R_2}{CR_1R_2}t}).$$

Figure 23:
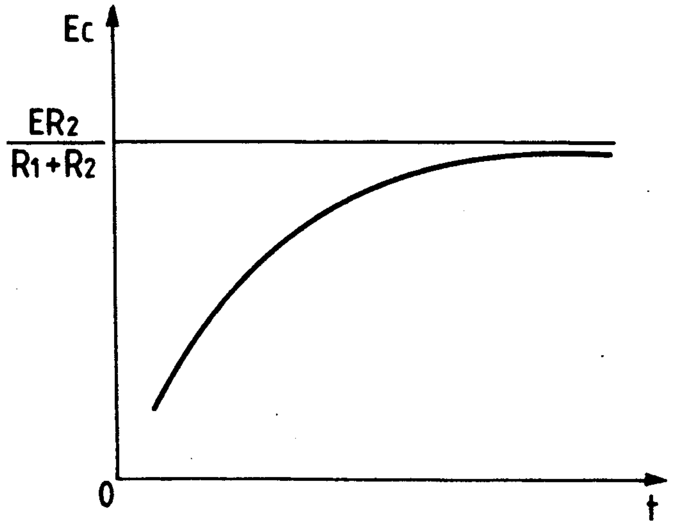
FIG. 23 is a graph showing the variation in a charging voltage of a capacitor.

This is shown as a graph in FIG. 23, where, when $t = \epsilon$ (infinity), the voltage Ec will be constant.

Now, since $Ec = R_2E/(R_1 + R_2)$, it can be understood that the smaller the conductor resistance $R_1$ of the toner chain the greater the voltage Ec applied to both ends of the capacitor.

Further, the amount Q of the charges accumulated on both polarities of the capacitor ($Q = CEc$) is increased as the voltage Ec increases.

Further, since the electrostatic attraction force $F_E$ between the charges accumulated on both polarities of the capacitor C is $Q^2/2\epsilon_O S$, the value $F_E$ becomes greater as the value Q is increased. If the minimum voltage Ec required for maintaining the normal image quality is $E_M$, since $E_M \leqq R_2E/(R_1 + R_2)$, the following relation is established:

$$R_1 \leqq R_2(E/E_M - 1) = R_M.$$

In order to reduce the conductor resistance $R_1$ below the regulated value $R_M$, the toner is accumulated ahead of the conductor exposed portions 1*e* as already described regarding the conventional case.

Next, the image effective area when a guide member 15 is mounted in the vicinity of the image forming portion of the image forming apparatus will be explained with reference to FIGS. 16 and 17.

In FIG. 16, the guide member (guide means) 15 is disposed in the vicinity of the image forming portion to regulate the flow-in of the toner 2. The guide member 15 regulates the shifting direction of the recording sheet 5 by deviating a portion of the recording sheet from the drive roller 6*b* just on this side of the image forming portion and also indirectly regulates the amount of the toner flowing into the image forming portion, via the recording sheet 5.

When the guide member 15 is used, an angle $\theta_2$ between line segments KF, GH of the image effective area KFHG is smaller than the angle $\theta_1$ between the line segments EF, GH of the image effective area EFGH when the guide member is not used. Accordingly, as shown in FIG. 17, when the toner 2 in the image effective area KFGH is subjected to the weight $W_{At}$ of the accumulated toner and a force P due to the toner feeding speed V from a direction perpendicular to the line segment KG, the toner compressing forces $P/(2 \sin \theta_2/2)$ acting on the toner from the directions perpendicular to the line segments KF, GH become greater than the toner compressing forces $P/(2 \sin \theta_1/2)$ acting on the image effective area EFGH. Therefore, as in the conventional example, since the conductor resistance $R_1$ of the toner chain is decreased to increase the electrostatic attraction force $F_E$ for attracting the toner 2 toward the recording sheet 5, it is possible to increase the image density.

Further, it is possible to increase the distance of the gap between the recording sheet 5 and the recording electrodes 1 within a range wherein the conductor resistance of the toner 2 is below the regulated value (decrement in the resistance of the toner due to the increase in the toner compressing force plus (+) increment in the resistance due to the increase in the gap distance ≦ regulated value $R_M$), while keeping the toner feeding speed V constant. Thus, since the critical manufacturing accuracy of the drive feed roller 6*b*, sleeve 3 and the like is not required, the apparatus can be manufactured cheaply.

Further, when the longitudinal dimension of the apparatus is increased, although the gap distance between the recording sheet 5 and the recording electrodes 1 must be increased, by maintaining the value of the conductor resistance $R_1$ of the toner chain increasing in proportion to the increase in the gap distance below the regulated value $R_M$, it is possible to reduce the increase in the toner feeding speed V and outer diameters of the drive feed roller 6*b* and sleeve 3. Thus, the power sources for the rollers can be small-sized to reduce the power consumption, thus making the apparatus lightweight.

Further, since the area of the recording sheet 5 swept by the toner 2 adhered to the sleeve 3 after the image forming operation can be reduced, it is possible to reduce the unevenness in the image. In addition, by varying the toner feeding speed V, the resonance point in the whole apparatus can be avoided.

Figure 18:
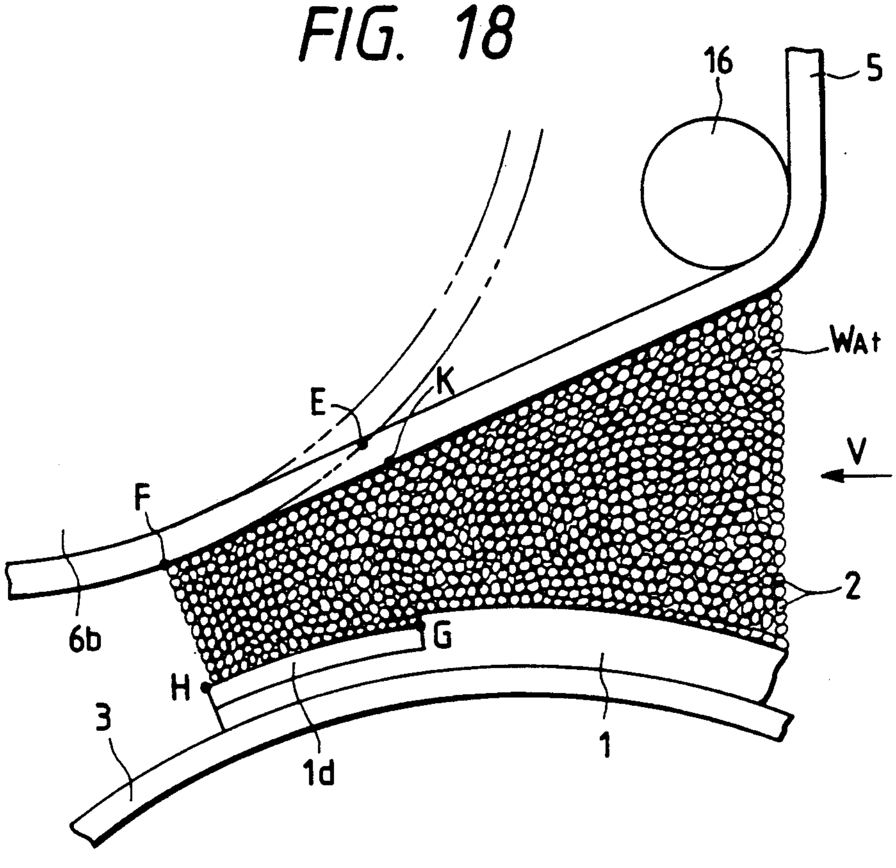
FIG. 18 is an enlarged sectional view for explaining a further example of the image forming portion.

Incidentally, while the guide member 15 was a plate-shaped guide member, as shown in FIG. 18, in place of the plate-shaped guide member, a roller member 16 may be used to deviate a portion of the recording sheet 5 from the drive roller 6*b* just on this side of the image forming portion for regulating the shifting direction of the recording sheet 5 and to also indirectly regulate the amount of the toner flowing into the image forming portion, via the recording sheet 5.

Next, a further embodiment of the guide means disposed in the vicinity of the image forming portion for regulating the flow-in of the toner will be explained with reference to FIG. 24 and 25.

Figure 24:
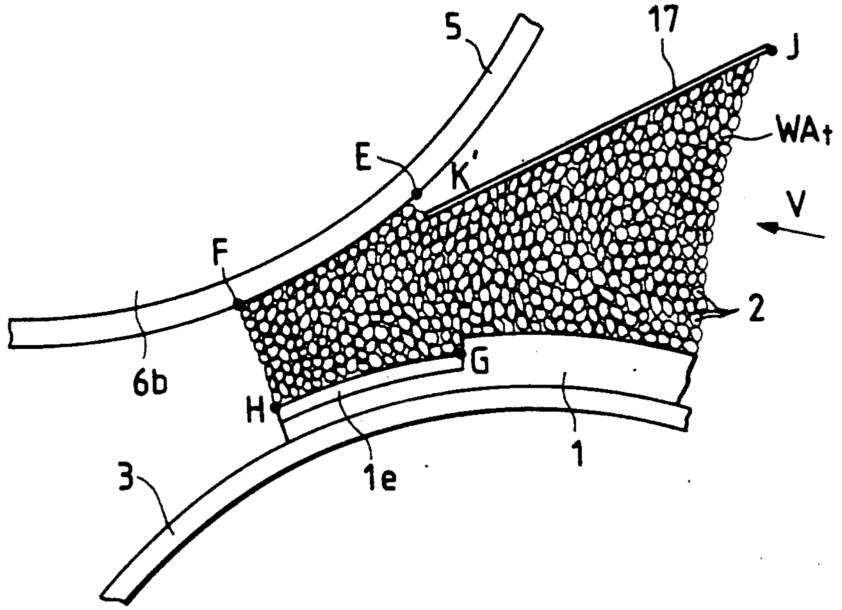
FIG. 24 is a sectional view showing another example of a guide member.

In FIG. 24, a plate-shaped guide member 17 is disposed ahead of the image effective areas EFGH and between the recording sheet 5 and the recording electrodes 1 and acts to channel direct the toner 2 moving at the speed V into the image effective area EFGH.

Starting and terminal points J' and K' of the guide member 17, and the terminal point F of the image effective area facing the recording sheet 5 are aligned with each other. And, an angle $\theta_2'$ between the line segments J'F and GH is smaller than $\theta_1$.

Figure 25:
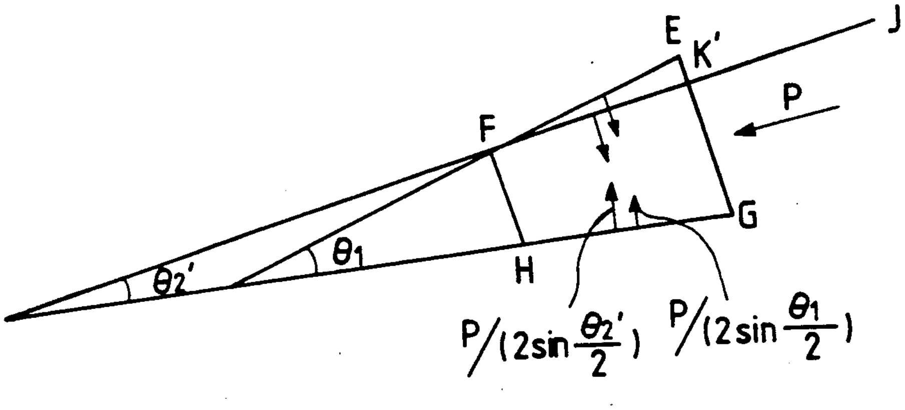
FIG. 25 is an explanatory view for explaining another example of the image effective area.
Figure 24:
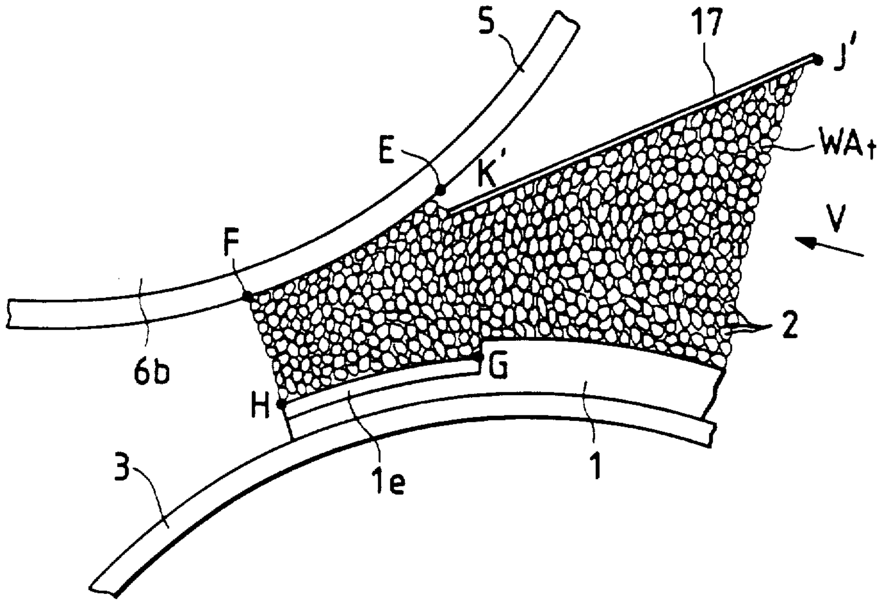
Figure 25:
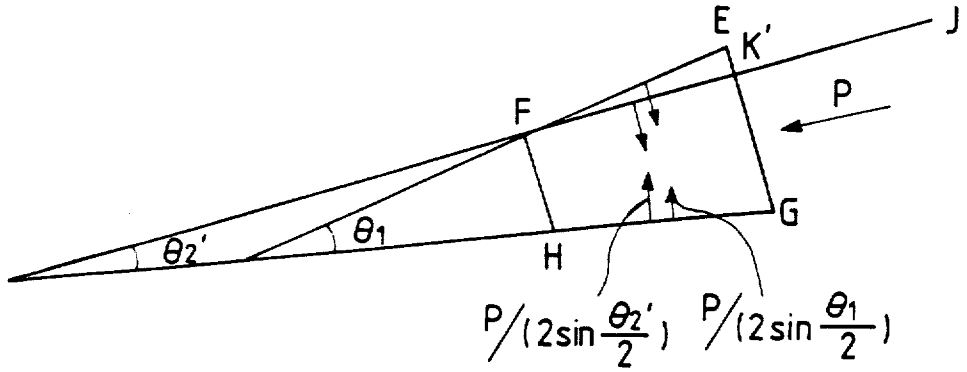

By adding the guide member 17, the behavior of the toner in the image effective area EFGH can be viewed as a case where the image effective area is reduced to an area K'FGH, as shown in FIG. 25.

Accordingly, when the toner 2 in the image effective area K'FGH is subjected to the weight $W_{At}$ of the accumulated toner and a force P due to the toner feeding speed V from a direction perpendicular to the line segment K'G, the toner compressing forces $P/(2 \sin \theta_2'/2)$ acting on the toner from the directions perpendicular to the line segments K'F, GH become greater than the toner compressing forces $P/(2 \sin \theta_1/2)$ acting on the image effective area EFGH. Therefore, as in the conventional example, since the conductor resistance $R_1$ of the toner chain is decreased to increase the electrostatic attraction force $F_E$ for attracting the toner 2 toward the recording sheet 5, it is possible to increase the image density.

As mentioned above, according to the embodiment shown in FIG. 15, since the compression means are provided in the vicinity of the recording electrodes, it is possible to effectively compress the developer accumulated near the image forming portion of the recording medium in the charge applying direction and to hold the developer in the recording position by means of the prevention means for preventing the developer from shifting. Thereby, it is possible to further reduce the electric resistance between the developer particles and to increase the toner amount to be adhered to the recording medium. Accordingly, the image density can be increased, and the driving sources can be small-sized to make it inexpensive, thus making the whole apparatus compact.

Further, it is possible to increase the distance of the gap between the recording medium and the recording electrodes within a range wherein the conductor resistance of the developer is below the regulated value (decrement in the resistance of the developer due to the increase in the developer compressing force plus (+) increment in the resistance due to the increase in the gap distance ≦ regulated value), while keeping the developer feeding speed constant. Thus, since the critical manufacturing accuracy of the drive feed roller, sleeve and the like is not required, the apparatus can be manufactured cheaply.

Further, when the longitudinal dimension of the apparatus is increased, although the gap distance between the recording medium and the recording electrodes must be increased, by maintaining the value of the conductor resistance of the toner chain increasing in proportion to the increase in the gap distance below the regulated value, it is possible to reduce the increase in the developer feeding speed and outer diameters of the drive feed roller and sleeve. Thus, the power sources for the rollers can be small-sized to reduce the power consumption, thus making the whole apparatus lightweight. Further, since the area of the recording sheet 5 swept by the developer adhered to the sleeve after the image forming operation can be reduced, it is possible to reduce the unevenness in the image.

What is claimed is:

1. An image forming apparatus comprising:

a plurality of recording electrodes;

a voltage applying means for applying a signal voltage to said recording electrodes in response to image information;

a recording medium disposed in confronting relation to said recording electrodes;

a means for causing a relative movement between said recording electrodes and said recording medium;

a developer supplying means for supplying developer between said recording electrodes and said recording medium; and a prevention means disposed proximate said recording electrodes and downstream thereof in a developer moving direction, said prevention means being located at a position nearer to the recording medium than a surface of said recording electrodes, for preventing the developer from shifting.

2. An image forming apparatus according to claim 1, wherein said prevention means comprises a protruded member disposed on said recording electrodes in a direction transverse to the developer moving direction.

3. An image forming apparatus according to claim 2, wherein said protruded member is coated by an insulative layer.

4. An image forming apparatus according to claim 1, wherein said prevention means comprises a wire member disposed between said recording electrodes and said recording medium in a direction transverse to the developer moving direction.

5. An image forming apparatus according to claim 4, wherein said wire member is coated by an insulative layer.

6. An image forming apparatus comprising:

a plurality of recording electrodes;

a voltage applying means for applying a signal voltage to said recording electrodes in response to image information;

a recording medium disposed in confronting relation to said recording electrodes and having a charge holding layer thereon;

a means for causing a relative movement between said recording electrodes and said recording medium;

a developer supplying means having a magnetic means for supplying magnetic developer between said recording electrodes and said recording medium; and a prevention means disposed proximate said recording electrodes and downstream thereof in a developer moving direction, said prevention means being located at a position nearer to the recording medium than a surface of said recording electrode, for preventing the developer from shifting.

7. An image forming apparatus according to claim 6, wherein said prevention means comprises a protruded member disposed on said recording electrodes in a direction transverse to the developer moving direction.

8. An image forming apparatus according to claim 7, wherein said protruded member is coated by an insulative layer.

9. An image forming apparatus according to claim 6, wherein said prevention means comprises a wire member disposed between said recording electrodes and said recording medium in a direction transverse to the developer moving direction.

10. An image forming apparatus according to claim 9, wherein said wire member is coated by an insulative layer.

11. An image forming apparatus comprising:

a plurality of recording electrodes;

a voltage applying means for applying a signal voltage to said recording electrodes in response to image information;

a belt-shaped recording medium disposed in confronting relation to said recording electrodes and having a charge holding layer thereon;

a means for causing a relative movement between said recording electrodes and said recording medium;

a developer supplying means having a magnetic means for supplying magnetic developer between said recording electrodes and said recording medium;

a prevention means disposed proximate said recording electrodes and downstream thereof in a developer moving direction, said prevention means being located at a position nearer to the recording medium than a surface of said recording electrodes, for preventing the developer from shifting; and a developer image displaying optical opening formed in a housing of the image forming apparatus so that a developer image formed on said recording medium can be visually displayed.

12. An image forming apparatus according to claim 11, wherein said prevention means comprises a protruded member disposed on said recording electrodes in a direction transverse to the developer moving direction.

13. An image forming apparatus according to claim 11, wherein said prevention means comprises a wire member disposed between said recording electrodes and said recording medium in a direction transverse to the developer moving direction.

14. An image forming apparatus comprising:

a plurality of recording electrodes;

a voltage applying means for applying a signal voltage to said recording electrodes in response to image information;

a recording medium disposed in confronting relation to said recording electrodes;

a means for causing a relative movement between said recording electrodes and said recording medium;

a developer supplying means for supplying developer between said recording electrodes and said recording medium;

a compression means disposed proximate said recording electrodes and upstream thereof in a developer moving direction, for compressing the developer supplied and accumulated; and a prevention means disposed proximate said recording electrodes and downstream thereof in a developer moving direction, said prevention means being located at a position nearer to the recording medium than a surface of said recording electrodes, for preventing the developer from shifting.

15. An image forming apparatus according to claim 14, wherein said prevention means comprises a protruded member disposed on said recording electrodes in a direction transverse to the developer moving direction.

16. An image forming apparatus according to claim 15, wherein said protruded member is coated by an insulative layer.

17. An image forming apparatus according to claim 14, wherein said prevention means comprises a wire member disposed between said recording electrodes and said recording medium in a direction transverse to the developer moving direction.

18. An image forming apparatus according to claim 17, wherein said wire member is coated by an insulative layer.

19. An image forming apparatus according to claim 14, wherein said recording medium is belt-shaped, and said compression means is formed by positively deforming said belt-shaped recording medium by means of a guide member.

20. An image forming apparatus according to claim 14, wherein said compression means comprises a guide member disposed proximate of said recording medium.

21. An image forming apparatus comprising:

a plurality of recording electrodes;

a voltage applying means for applying a single voltage to said recording electrodes in response to image information;

a belt-shaped recording medium disposed in confronting relation to said recording electrodes and having a charge holding layer thereon;

a means for causing a relative movement between said recording electrodes and said recording medium;

a developer supplying means having a magnetic means for supplying magnetic developer between said recording electrodes and said recording medium;

a compression means disposed proximate said recording electrodes and upstream thereof in a developer moving direction, for compressing the developer supplied and accumulated;

a prevention means disposed proximate said recording electrodes and downstream thereof in a developer moving direction, said preventing means being located at a position nearer to the recording medium than a surface of said recording electrodes, for preventing the developer from shifting; and a developer image displaying optical opening formed in a housing of the image forming apparatus so that a developer image formed on said recording medium can be visually displayed.

22. An image forming apparatus according to claim 21, wherein said prevention means comprises a protruded member disposed on said recording electrodes in a direction transverse to the developer moving direction.

23. An image forming apparatus according to claim 21, wherein said prevention means comprises a wire member disposed between said recording electrodes and said recording medium in a direction transverse to the developer moving direction.

24. An image forming apparatus according to claim 21, wherein said recording medium is belt-shaped, and said compression means is formed by positively deforming said belt-shaped recording medium by means of a guide member.

25. An image forming apparatus according to claim 21, wherein said compression means comprises a guide member disposed proximate said recording medium.

* * * * *

UNITED STATES PATENT AND TRADEMARK OFFICE
CERTIFICATE OF CORRECTION

PATENT NO. : 5,198,840
DATED : March 30, 1993
INVENTOR(S) : TOSHIHIKO OCHIAI, ET AL.

It is certified that error appears in the above-identified patent and that said Letters Patent is hereby corrected as shown below:

SHEET 14, FIGURE 24

"J" should read --J'--.(See attached sheet.)

COLUMN 1

Line 57, "40 V" should read --+40 V--.

COLUMN 4

Line 58, "butylal" should read --butyral--.
Line 62, "condictivity" should read --conductivity--.

COLUMN 5

Line 50, "interfare" should read --interfere--.

COLUMN 9

Line 52, "constructural" should read --structural--.
Line 63, "constructural" should read --structural--.

COLUMN 10

Line 54, "resembled" should read --viewed--.
Line 66, "reversed as to" should read --viewed as--.

UNITED STATES PATENT AND TRADEMARK OFFICE

CERTIFICATE OF CORRECTION

PATENT NO. : 5,198,840
DATED : March 30, 1993
INVENTOR(S) : TOSHIHIKO OCHIAI, ET AL.

It is certified that error appears in the above-identified patent and that said Letters Patent is hereby corrected as shown below:

COLUMN 11

Line 12, "value $RM_1$," should read --value $R_{M1}$,--; and "force $FE_1$" should read --force $F_E$--.
Line 39, "constructural" should read --structural--.
Line 60, "weight" should read --the weight--.

COLUMN 12

Line 24, "arises" should read --arise--.

COLUMN 13

Line 28, "neglected. (1)" should read --neglected. ¶ (1)--.

COLUMN 14

Line 33, "$t=\epsilon$" should read --$t=\infty$--.

COLUMN 15

Line 67, "channel direct" should read --directly channel--.

UNITED STATES PATENT AND TRADEMARK OFFICE

CERTIFICATE OF CORRECTION

PATENT NO. : 5,198,840

DATED : March 30, 1993

INVENTOR(S) : TOSHIHIKO OCHIAI, ET AL.

It is certified that error appears in the above-identified patent and that said Letters Patent is hereby corrected as shown below:

<u>COLUMN 17</u>

Line 52, "electrode" should read --electrodes,--.

<u>COLUMN 19</u>

Line 14, "of" should be deleted.
Line 17, "single" should read --signal--.

<u>COLUMN 20</u>

Line 6. "preventing" should read --prevention--.

Signed and Sealed this

Nineteenth Day of April, 1994

*Attest:*

BRUCE LEHMAN

*Attesting Officer* *Commissioner of Patents and Trademarks*